(12) United States Patent
Ly et al.

(10) Patent No.: US 12,356,466 B2
(45) Date of Patent: Jul. 8, 2025

(54) RESOURCE MAPPING FOR RANDOM ACCESS REPETITIONS USING A SAME SPATIAL FILTER

(71) Applicant: QUALCOMM Incorporated, San Diego, CA (US)

(72) Inventors: Hung Dinh Ly, San Diego, CA (US); Kexin Xiao, Shanghai (CN); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/731,211

(22) Filed: May 31, 2024

(65) Prior Publication Data

US 2024/0324025 A1 Sep. 26, 2024

Related U.S. Application Data

(63) Continuation of application No. PCT/CN2022/085262, filed on Apr. 6, 2022.

(51) Int. Cl.
*H04W 74/0833* (2024.01)

(52) U.S. Cl.
CPC .............. *H04W 74/0833* (2013.01)

(58) Field of Classification Search
CPC .............. H04W 74/0833; H04W 74/00
See application file for complete search history.

(56) References Cited

U.S. PATENT DOCUMENTS

2020/0389841 A1* 12/2020 Kim ............... H04W 74/0833
2021/0051707 A1* 2/2021 Rastegardoost ...... H04W 72/23
(Continued)

FOREIGN PATENT DOCUMENTS

| CN | 110876205 A | 3/2020 |
| WO | 2021129555 A1 | 7/2021 |
| WO | 2021177741 A1 | 9/2021 |

OTHER PUBLICATIONS

Ericsson: "Signaling of Random Access Parameters [M063]", 3GPP TSG-RAN WG2 ad hoc on NR, Tdoc R2-1800979, Vancouver, Canada, Jan. 22-26, 2017, 9 Pages, The whole document.
(Continued)

*Primary Examiner* — Siren Wei
(74) *Attorney, Agent, or Firm* — Guang Y. Zhang; Holland & Hart LLP

(57) ABSTRACT

The described techniques enable repeated physical random access channel (PRACH) preamble transmissions across multiple random access occasions (ROs) using a same spatial filter. A user equipment (UE) may transmit a PRACH preamble across multiple ROs, where each RO is associated with a same synchronization signal block (SSB) or channel state information reference signal (CSI-RS). The PRACH repetitions may be transmitted in ROs in accordance with a first mapping rule: first, in increasing order of frequency resource index; second, in increasing order of a time resource index; third, in increasing order of PRACH slot indices; and fourth, in increasing order of PRACH association period indices. Additionally, or alternatively, the PRACH repetitions may be transmitted in ROs in accordance with a second mapping rule: first, in increasing order of time resource index; second, in increasing order of PRACH slot indices; and third, in increasing order of PRACH association period indices.

29 Claims, 17 Drawing Sheets

(56) References Cited

U.S. PATENT DOCUMENTS

| | | | |
|---|---|---|---|
| 2021/0329718 A1* | 10/2021 | Hu | H04W 76/11 |
| 2022/0046725 A1* | 2/2022 | Xiong | H04W 74/0841 |
| 2023/0188261 A1* | 6/2023 | Awadin | H04L 1/08 |
| | | | 370/329 |
| 2023/0217339 A1* | 7/2023 | Chen | H04W 36/38 |
| | | | 370/331 |

OTHER PUBLICATIONS

International Search Report and Written Opinion—PCT/CN2022/085262—ISA/EPO—Nov. 28, 2022.

* cited by examiner

RESOURCE MAPPING FOR RANDOM ACCESS REPETITIONS USING A SAME SPATIAL FILTER

CROSS REFERENCES

The present application for patent is a continuation of Chinese PCT Patent Application No. PCT/CN2022/085262 by LY et al., entitled "RESOURCE MAPPING FOR RANDOM ACCESS REPETITIONS USING A SAME SPATIAL FILTER," filed Apr. 6, 2022, assigned to the assignee hereof, and expressly incorporated by reference in its entirety herein.

FIELD OF TECHNOLOGY

The following relates to wireless communications, including resource mapping for random access repetitions using a same spatial filter.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support resource mapping for random access repetitions using a same spatial filter. For example, the described techniques provide for repeated physical random access channel (PRACH) preamble transmissions across multiple random access occasions (ROs) when using the same spatial filter (e.g., the same beamforming direction). In particular, a user equipment (UE) may transmit a PRACH preamble across multiple ROs, where each RO is associated with a same synchronization signal block SSB (e.g., a strongest SSB as determined by the UE), channel state information reference signal (CSI-RS), or both. In such cases, the PRACH repetitions may be transmitted in ROs in accordance with a first mapping rule or order (e.g., based on ROs that overlap in the time domain): first, in increasing order of frequency resource index; second, in increasing order of a time resource index; third, in increasing order of PRACH slot indices; and fourth, in increasing order of PRACH association period indices. Additionally, or alternatively, the PRACH repetitions may be transmitted in ROs in accordance with a second mapping rule or order (e.g., based on ROs that do not overlap in the time domain): first, in increasing order of time resource index; second, in increasing order of PRACH slot indices; and third, in increasing order of PRACH association period indices. In some examples, the quantity of (e.g., number of) PRACH repetitions may be the same as or different than a quantity of possible retransmissions of the PRACH preamble. Thus, the UE may transmit a PRACH on a cell via resources (e.g., PRACH resources, repetition resources, ROs) using a same spatial filter (e.g., a same beam direction) for multiple preamble repetitions.

A method for wireless communications at a UE is described. The method may include receiving a message indicating a configuration for repeating transmissions of a first random access message of a random access procedure, selecting a set of random access occasions for a quantity of repetitions of the first random access message in accordance with the configuration and a mapping rule, where the mapping rule is based on resources associated with each random access occasion of the set of random access occasions, and transmitting the quantity of repetitions of the first random access message using a same spatial filter via the set of random access occasions.

An apparatus for wireless communications at a UE is described. The apparatus may include one or more memories and one or more processors coupled with the one or more memories. The one or more processors may be configured to cause the apparatus to receive a message indicating a configuration for repeating transmissions of a first random access message of a random access procedure, select a set of random access occasions for a quantity of repetitions of the first random access message in accordance with the configuration and a mapping rule, where the mapping rule is based on resources associated with each random access occasion of the set of random access occasions, and transmit the quantity of repetitions of the first random access message using a same spatial filter via the set of random access occasions.

Another apparatus for wireless communications at a UE is described. The apparatus may include means for receiving a message indicating a configuration for repeating transmissions of a first random access message of a random access procedure, means for selecting a set of random access occasions for a quantity of repetitions of the first random access message in accordance with the configuration and a mapping rule, where the mapping rule is based on resources associated with each random access occasion of the set of random access occasions, and means for transmitting the quantity of repetitions of the first random access message using a same spatial filter via the set of random access occasions.

A non-transitory computer-readable medium storing code for wireless communications at a UE is described. The code may include instructions executable by one or more processors to cause the apparatus to receive a message indicating a configuration for repeating transmissions of a first random access message of a random access procedure, select a set of random access occasions for a quantity of repetitions of the first random access message in accordance with the configuration and a mapping rule, where the mapping rule is based on resources associated with each random access occasion of the set of random access occasions, and transmit the quantity of repetitions of the first random access message using a same spatial filter via the set of random access occasions.

In some examples of the method, apparatuses, and non-transitory computer-readable medium described herein, selecting the set of random access occasions in accordance with the mapping rule may include operations, features, means, or instructions for identifying a CSI-RS, a SSB from a set of SSBs, or both and selecting the set of random access occasions based on an association between the set of random access occasions, the SSB, the CSI-RS, or a combination thereof.

In some examples of the method, apparatuses, and non-transitory computer-readable medium described herein, selecting the set of random access occasions in accordance with the mapping rule may include operations, features, means, or instructions for selecting one or more first random access occasions based on a respective frequency-domain index of the resources associated with each random access occasion of the set of random access occasions.

In some examples of the method, apparatuses, and non-transitory computer-readable medium described herein, selecting the set of random access occasions in accordance with the mapping rule may include operations, features, means, or instructions for selecting one or more second random access occasions based on a respective time-domain index of the resources associated with each random access occasion of the set of random access occasions, the one or more second random access occasions being included in a same slot.

In some examples of the method, apparatuses, and non-transitory computer-readable medium described herein, selecting the set of random access occasions in accordance with the mapping rule may include operations, features, means, or instructions for selecting one or more third random access occasions based on a respective slot index of the resources associated with each random access occasion of the set of random access occasions.

In some examples of the method, apparatuses, and non-transitory computer-readable medium described herein, selecting the set of random access occasions in accordance with the mapping rule may include operations, features, means, or instructions for selecting one or more fourth random access occasions based on a respective association period index of the resources associated with each random access occasion of the set of random access occasions.

In some examples of the method, apparatuses, and non-transitory computer-readable medium described herein, selecting the set of random access occasions in accordance with the mapping rule may include operations, features, means, or instructions for identifying a channel state information-reference signal, a SSB from a set of SSBs, or both and selecting the set of random access occasions based on an association between the set of random access occasions, the SSB, the channel state information-reference signal, or a combination thereof, where respective random access occasions of the set of random access occasions may be non-overlapping in time.

In some examples of the method, apparatuses, and non-transitory computer-readable medium described herein, selecting the set of random access occasions in accordance with the mapping rule may include operations, features, means, or instructions for selecting one or more first random access occasions based on a respective time-domain index of the resources associated with each random access occasion of the set of random access occasions, the one or more first random access occasions being included in a same slot.

In some examples of the method, apparatuses, and non-transitory computer-readable medium described herein, selecting the set of random access occasions in accordance with the mapping rule may include operations, features, means, or instructions for selecting one or more second random access occasions based on a respective slot index of the resources associated with each random access occasion of the set of random access occasions.

In some examples of the method, apparatuses, and non-transitory computer-readable medium described herein, selecting the set of random access occasions in accordance with the mapping rule may include operations, features, means, or instructions for selecting one or more third random access occasions based on a respective association period index of the resources associated with each random access occasion of the set of random access occasions.

Some examples of the method, apparatuses, and non-transitory computer-readable medium described herein may further include operations, features, means, or instructions for identifying the quantity of repetitions of the first random access message based on the configuration, where the quantity of repetitions of the first random access message may be the same as a quantity of possible retransmissions of the first random access message.

Some examples of the method, apparatuses, and non-transitory computer-readable medium described herein may further include operations, features, means, or instructions for identifying the quantity of repetitions of the first random access message based on the configuration, where the quantity of repetitions of the first random access message may be different than a quantity of possible retransmissions of the first random access message.

In some examples of the method, apparatuses, and non-transitory computer-readable medium described herein, the mapping rule includes a first mapping rule for respective random access occasions of the set of random access occasions that overlap in time or a second mapping rule for the respective random access occasions of the set of random access occasions that may be non-overlapping in time and the method, apparatuses, and non-transitory computer-readable medium may include further operations, features, means, or instructions for receiving a second message configuring the UE with the first mapping rule or the second mapping rule.

In some examples of the method, apparatuses, and non-transitory computer-readable medium described herein, the message includes a radio resource control message or a system information message, or any combination thereof.

In some examples of the method, apparatuses, and non-transitory computer-readable medium described herein, transmitting the quantity of repetitions of the first random access message may include operations, features, means, or instructions for transmitting the quantity of repetitions of the first random access message across two or more association patterns based on a quantity of random access occasions in the set of random access occasions.

In some examples of the method, apparatuses, and non-transitory computer-readable medium described herein, transmitting the quantity of repetitions of the first random access message may include operations, features, means, or instructions for transmitting an initial portion of the quantity of repetitions of the first random access message during a current association pattern based on a quantity of random access occasions in the set of random access occasions and stopping transmission of a remaining portion of the quantity of repetitions of the first random access message after the current association pattern ends.

In some examples of the method, apparatuses, and non-transitory computer-readable medium described herein, the quantity of repetitions of the first random access message may be transmitted within a single association pattern.

In some examples of the method, apparatuses, and non-transitory computer-readable medium described herein, the random access procedure includes a four-step random access procedure or a two-step random access procedure.

A method for wireless communications at a network entity is described. The method may include transmitting a message indicating a configuration for repeating transmissions of a first random access message of a random access procedure and receiving, using a same spatial filter, a quantity of repetitions of the first random access message over a set of random access occasions based on the configuration, the set of random access occasions are based on a mapping rule, where the mapping rule is based on resources associated with each random access occasion of the set of random access occasions.

An apparatus for wireless communications at a network entity is described. The apparatus may include one or more memories and one or more processors coupled with the one or more memories. The one or more processors may be configured to cause the apparatus to transmit a message indicating a configuration for repeating transmissions of a first random access message of a random access procedure and receive, using a same spatial filter, a quantity of repetitions of the first random access message over a set of random access occasions based on the configuration, the set of random access occasions are based on a mapping rule, where the mapping rule is based on resources associated with each random access occasion of the set of random access occasions.

Another apparatus for wireless communications at a network entity is described. The apparatus may include means for transmitting a message indicating a configuration for repeating transmissions of a first random access message of a random access procedure and means for receiving, using a same spatial filter, a quantity of repetitions of the first random access message over a set of random access occasions based on the configuration, the set of random access occasions are based on a mapping rule, where the mapping rule is based on resources associated with each random access occasion of the set of random access occasions.

A non-transitory computer-readable medium storing code for wireless communications at a network entity is described. The code may include instructions executable by one or more processors to transmit a message indicating a configuration for repeating transmissions of a first random access message of a random access procedure and receive, using a same spatial filter, a quantity of repetitions of the first random access message over a set of random access occasions based on the configuration, the set of random access occasions are based on a mapping rule, where the mapping rule is based on resources associated with each random access occasion of the set of random access occasions.

In some examples of the method, apparatuses, and non-transitory computer-readable medium described herein, the set of random access occasions may be based on an association between the set of random access occasions and a same SSB or a same CSI-RS.

In some examples of the method, apparatuses, and non-transitory computer-readable medium described herein, the set of random access occasions may be based on a respective frequency-domain index of the resources associated with each random access occasion, or a respective time-domain index of the resources associated with each random access occasion of the set of random access occasions, or a respective slot index of the resources associated with each random access occasion of the set of random access occasions, or a respective association period index of the resources associated with each random access occasion of the set of random access occasions, or any combination thereof.

Some examples of the method, apparatuses, and non-transitory computer-readable medium described herein may further include operations, features, means, or instructions for determining the quantity of repetitions of the first random access message, the quantity of repetitions of the first random access message being the same as a quantity of possible retransmissions of the first random access message, where the configuration indicates the quantity of repetitions.

Some examples of the method, apparatuses, and non-transitory computer-readable medium described herein may further include operations, features, means, or instructions for determining the quantity of repetitions of the first random access message, the quantity of repetitions of the first random access message being different than a quantity of possible retransmissions of the first random access message, where the configuration indicates the quantity of repetitions.

In some examples of the method, apparatuses, and non-transitory computer-readable medium described herein, the mapping rule includes a first mapping rule for respective random access occasions of the set of random access occasions that overlap in time or a second mapping rule for the respective random access occasions of the set of random access occasions that may be non-overlapping in time and the method, apparatuses, and non-transitory computer-readable medium may include further operations, features, means, or instructions for transmitting a second message configuring a UE with the first mapping rule or the second mapping rule.

In some examples of the method, apparatuses, and non-transitory computer-readable medium described herein, the message includes a radio resource control message or a system information message, or any combination thereof.

In some examples of the method, apparatuses, and non-transitory computer-readable medium described herein, receiving the quantity of repetitions of the first random access message may include operations, features, means, or instructions for receiving the quantity of repetitions of the first random access message across two or more association patterns based on a quantity of random access occasions in the set of random access occasions.

In some examples of the method, apparatuses, and non-transitory computer-readable medium described herein, receiving the quantity of repetitions of the first random access message may include operations, features, means, or instructions for receiving an initial portion of the quantity of repetitions of the first random access message during a current association pattern based on a quantity of random access occasions in the set of random access occasions, where a remaining portion of the quantity of repetitions of the first random access message may be not received after the current association pattern ends.

In some examples of the method, apparatuses, and non-transitory computer-readable medium described herein, the quantity of repetitions of the first random access message may be received within a single association pattern.

DETAILED DESCRIPTION

Figure 1:
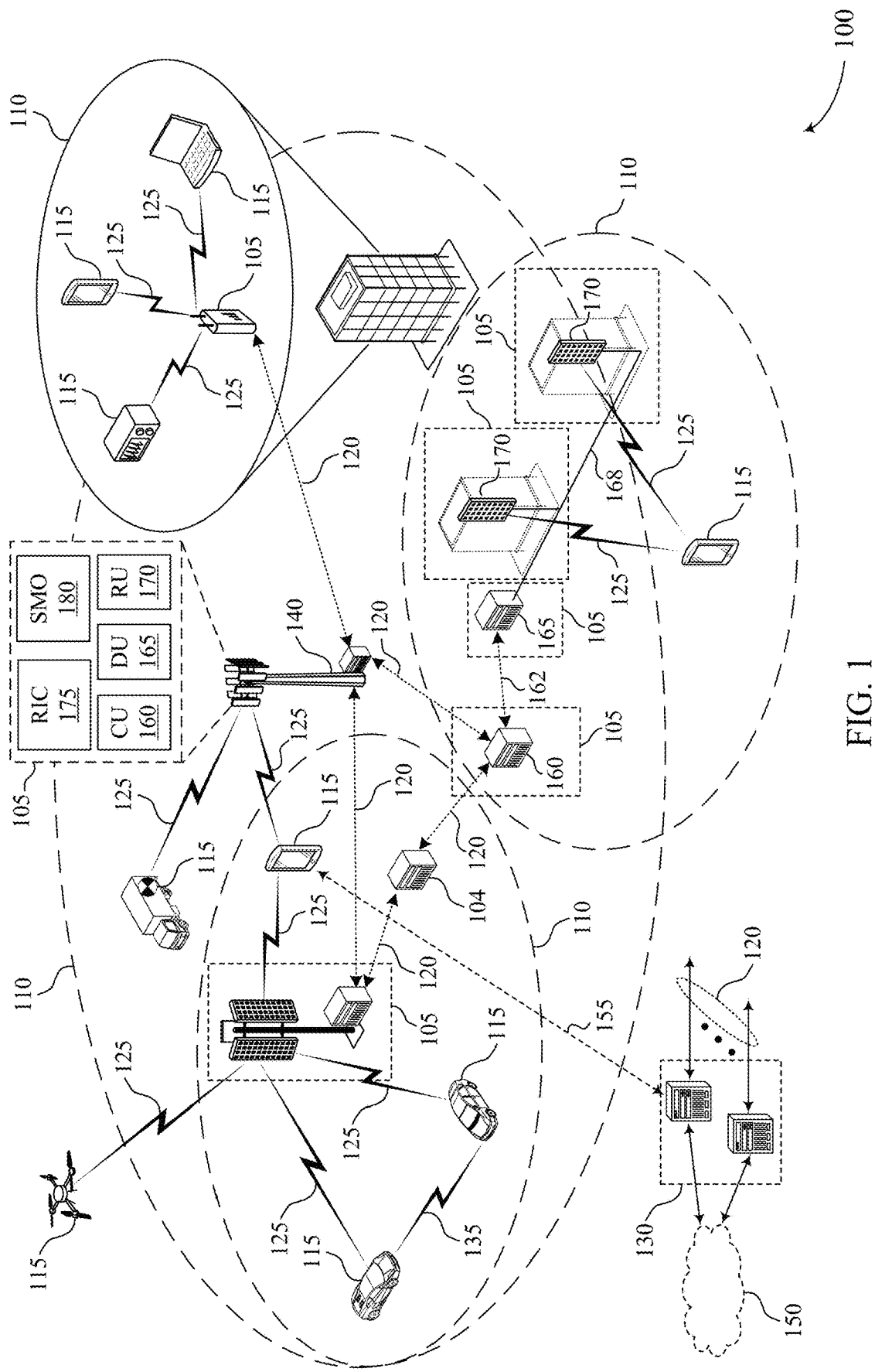
FIG. 1 illustrates an example of a wireless communications system that supports resource mapping for random access repetitions using a same spatial filter in accordance with one or more aspects of the present disclosure.

A user equipment (UE) may perform random access channel (RACH) procedures to establish (e.g., or re-establish) communications with a network entity. For example, the UE may perform a 2-step RACH procedure, 4-step RACH procedure, or both. In any case, the UE may determine one or more unique identifiers (e.g., one or more physical RACH (PRACH) preambles) to transmit to the network entity during a RACH occasion (RO), where the PRACH preambles may be mapped to one or more beams, such as synchronization signal blocks (SSBs) detected by the UE, to enable coordination between the UE and the network entity. In some cases, the UE may transmit repetitions (e.g., according to an indication, a set of parameters) to increase the relative likelihood that the network entity may detect a PRACH transmission. For example, during a 4-step PRACH procedure, the UE may determine a set of PRACH preambles, where the PRACH preambles are mapped to SSBs received from the network entity (e.g., based on one or more measurements by the UE, such as a reference signal received power (RSRP) or a signal-to-interference plus noise ratio (SINR) associated with the SSBs). The UE may subsequently transmit the PRACH preambles according a quantity of repetitions (e.g., four repetitions) such that the network entity may detect one or more PRACH preambles, and therefore determine an SSB (e.g., beam) to utilize for subsequent communications with the UE.

In some cases, which RO the network entity detects the contention-based preamble may dictate which SSB, physical broadcast channel (PBCH), or both, the network entity determines to utilize for communications with the UE. Therefore, techniques for transmitting PRACH repetitions may be desirable to enable efficient communication that increase relative likelihoods that the network entity may detect a PRACH repetition during an RO. Likewise, configuration techniques that enable the repetition of the PRACH preamble when a UE is attempting to access the network via the network entity may also be desirable.

Aspects of the present disclosure provide techniques to enable repeated PRACH preamble transmissions across multiple ROs and while using the same spatial filter (e.g., the same beamforming direction associated with an SSB). For example, the UE may transmit a RACH preamble across multiple ROs, where each RO is associated with a same SSB (e.g., a strongest SSB as determined by the UE) and/or channel state information reference signal (CSI-RS). In such cases, the PRACH repetitions may be transmitted in ROs in accordance with a first mapping rule or order (e.g., based on ROs that overlap in the time domain): first, in increasing order of frequency resource index; second, in increasing order of a time resource index; third, in increasing order of PRACH slot indices; and fourth, in increasing order of PRACH association period indices. Additionally, or alternatively, the PRACH repetitions may be transmitted in ROs in accordance with a second mapping rule or order (e.g., based on ROs that do not overlap in the time domain): first, in increasing order of time resource index; second, in increasing order of PRACH slot indices; and third, in increasing order of PRACH association period indices. In some examples, the quantity of PRACH repetitions may be the same as or different than a quantity of possible retransmissions of the PRACH preamble. Such techniques may result in relatively increased coverage, lower latency, and better utilization of communications resources within the wireless communications system. It should be noted that the described techniques may be utilized in contention-based random access contexts, as well as contention-free random access contexts.

Aspects of the disclosure are initially described in the context of wireless communications systems. Aspects of the disclosure are further illustrated by and described with reference to repetition mappings and a process flow. Aspects of the disclosure are further illustrated by and described with reference to apparatus diagrams, system diagrams, and flowcharts that relate to resource mapping for random access repetitions using a same spatial filter.

FIG. 1 illustrates an example of a wireless communications system 100 that supports resource mapping for random access repetitions using a same spatial filter in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support resource mapping for random access repetitions using a same spatial filter as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

The wireless communications system 100 may support techniques to enable the UE 115 to perform repeated PRACH preamble transmissions during multiple PRACH occasions, where the PRACH transmissions sent via the multiple PRACH occasions are transmitted with a single spatial filter (e.g., a spatial domain filter). The wireless communications system 100 may further support techniques for preserving a mapping for one or more PRACH occasions across multiple PRACH association periods, multiple PRACH association patterns, or both. For example, based on parameters provided by a network entity 105, the UE 115 may transmit a PRACH preamble across multiple ROs, where each RO of the multiple ROs is mapped to a common SSB and/or CSI-RS. Here, for PRACH transmission with multiple repetitions (e.g., N repetitions), a set of N ROs may be used for multiple repetitions of a PRACH preamble, where the ROs of the set of ROs may be associated with a same SSB (e.g., a same SSB index). For example, in a RACH association period, there may be a quantity of ROs available to the UE 115 for PRACH preamble transmissions, where the ROs may be mapped to a strongest SSB and/or CSI-RS, for example, as measured by the UE 115. The UE 115 may receive instructions (e.g., a repetition configuration via higher layers) that PRACH preamble transmissions are to be repeated a quantity of times (e.g., four times) with each of the repetitions being mapped to the strongest SSB and/or CSI-RS.

The UE 115 may follow a set of rules (e.g., mapping rules) for determining how the PRACH preambles are transmitted via a set of resources, for example, based on frequency resource indices, increasing time resource indices, increasing order of PRACH slot indices, among other examples. In some cases, there may not be enough ROs within a given RACH association period to accomplish all four PRACH preamble repetitions, and the UE 115 may transmit a remaining portion of the PRACH preamble repetitions in subsequent RACH association periods without resetting RO to SSB mappings. For example, the UE 115 may transmit a first two PRACH preamble repetitions in a first RACH association period, and a second two PRACH preamble repetitions in a second RACH association period. Such techniques may result in relatively increased coverage, lower latency, and better utilization of communications resources within the wireless communications system 100.

Figure 2:
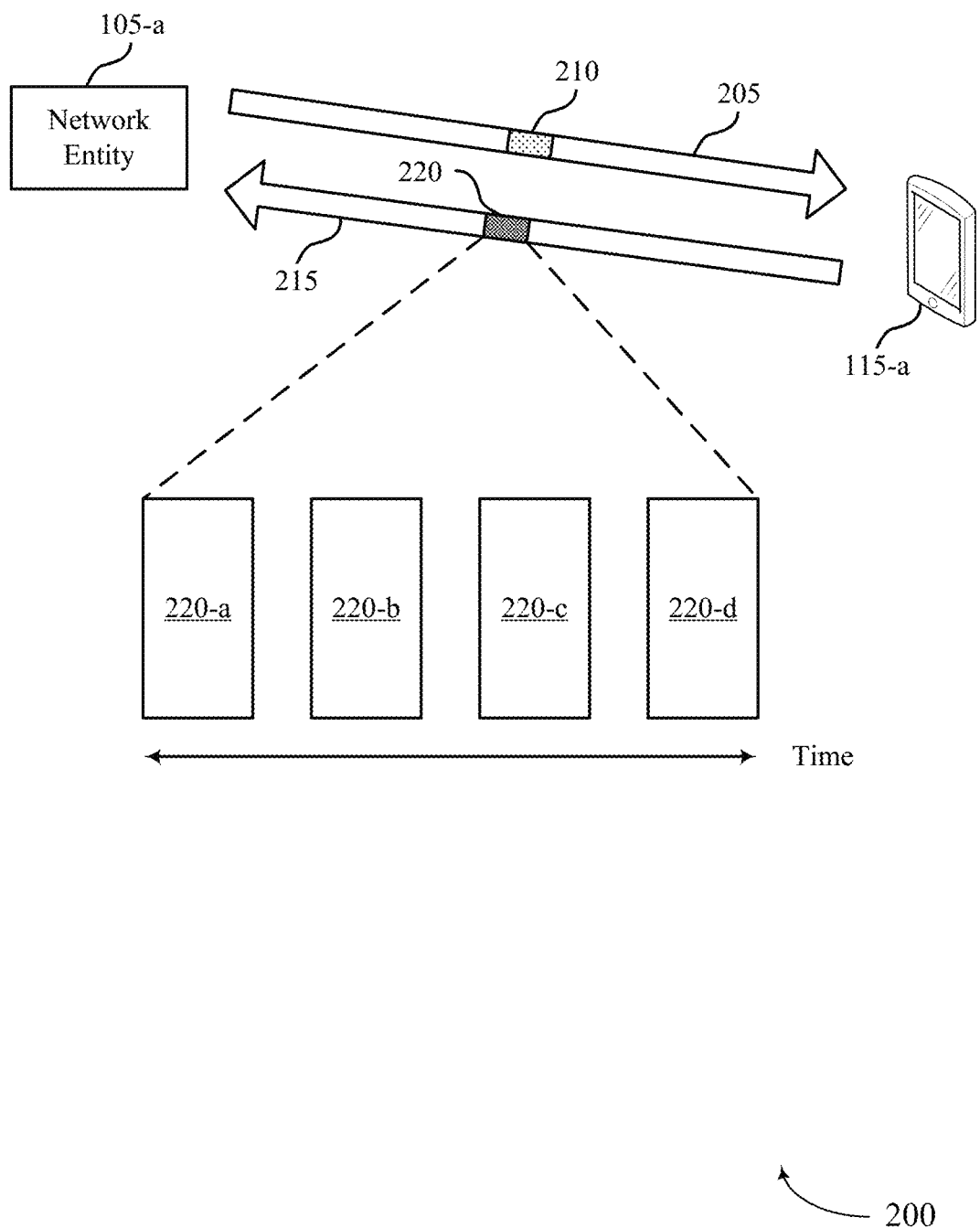
FIG. 2 illustrates an example of a wireless communications system that supports resource mapping for random access repetitions using a same spatial filter in accordance with one or more aspects of the present disclosure.

FIG. 2 illustrates an example of a wireless communications system 200 that supports resource mapping for random access repetitions using a same spatial filter in accordance with one or more aspects of the present disclosure. The wireless communications system 200 may include one or more aspects of the wireless communications system 100. For example, the wireless communications system 200 may include a UE 115-a and a network entity 105-a, which may be examples of the UE 115 and the network entity 105, as described with reference to FIG. 1. In some cases, the UE 115-a and the network entity 105-a may utilize a set of mapping rules, a configuration, or both, to enable PRACH repetitions during PRACH procedures.

In some cases, the network entity 105-a may communicate with the UE 115-a via a downlink channel 205. Similarly, the UE 115-a may communicate with the network entity 105-a via an uplink channel 215. In some cases, however, the UE 115-a and the network entity 105-a may coordinate to establish the uplink channel 215 (e.g., in cases of beam failure, initial network access, and the like). In such cases, the UE 115-a may perform a PRACH procedure based on one or more parameters and reference signals, among other signaling.

For example, the network entity 105-a may transmit, to the UE 115-a, one or more reference signals (e.g., SSBs), where the UE 115-a may measure the one or more reference signals to determine which SSBs to utilize for the PRACH procedure. Additionally, the network entity 105-a may transmit, to the UE 115-a, a message 210. In some examples, the message 210 may correspond to an indication of a configuration for repeating transmissions of a random access message for the PRACH procedure.

For example, based on the SSBs measured by the UE 115-a (e.g., based on an SINR of one or more SSBs), the UE 115-a may determine a mapping between the SSBs and ROs associated with the PRACH procedure. In some cases, the UE 115-a may map unique identifiers (e.g., PRACH preambles) to each SSB for subsequent procedures within the PRACH procedure. The PRACH preambles may be repeated (e.g., based on a configuration) by the UE 115-a by transmitting the PRACH preambles during one or more ROs. However, in some cases, such as those described by the present disclosure, the UE 115-a may select a single spatial filter (e.g., corresponding to a single SSB) to assign to multiple PRACH preambles, where the PRACH preambles are repeated across one or more ROs in accordance with a repetition number. For example, the UE 115-*a* may transmit one or more PRACH preamble repetitions according to the indication of the configuration for repeating transmissions associated with the message 210. In other examples, the UE 115-*a* may determine a quantity of PRACH repetitions based on a quantity of PRACH repetitions configured for a different PRACH procedure. For example, the UE 115-*a* may determine a quantity of PRACH repetitions for an initial access procedure based on a quantity of PRACH repetitions configured for a PRACH retransmission. In other cases, the UE 115-*a* may determine a quantity of PRACH repetitions different than the quantity of PRACH repetitions for PRACH retransmissions. In some examples, the indication of the configuration may correspond to a system information (SI) message, a radio resource control (RRC) message, or both, for the PRACH procedure.

Based on the indication in the message 210, the UE 115-*a* may transmit repetitions of a PRACH preamble 220 using one or more ROs. In some examples, the PRACH repetitions may correspond to multiple PRACH transmissions with different spatial domain filters, which may be associated with different reference signals. For example, the PRACH repetitions may be associated with different SSBs, different CSI-RSs (e.g., if the UE 115-*a* is in a connected status), or both. In some examples, the PRACH repetitions may correspond to multiple PRACH transmitted with a same spatial domain filter (e.g., a same SSB), which may be associated with an SSB, a CSI-RS, or both. For example, the UE 115-*a* may measure the SSBs received from the network entity 105-*a* to determine a strongest SSB (e.g., highest SINR, signal to noise ratio (SNR), or the like) to map to the PRACH repetitions.

For example, the UE 115-*a* may determine, from the message 210, that four PRACH repetitions may be transmitted to the network entity 105-*a*. In such cases, the UE 115-*a* may determine a mapping between ROs and PRACH preambles (e.g., associated with one or more ROs, PRACH occasions, PRACH associated periods, and the like) transmitted using a single spatial filter (e.g., beam direction) to transmit the PRACH repetitions. For example, based on the SSBs measured by the UE 115-*a*, the UE 115-*a* may determine a relatively strongest SSB or CSI-RS (e.g., having the highest SINR) to map to the PRACH repetitions to ROs. Based on the mapping, the UE 115-*a* may map the SSB to a first PRACH preamble 220-*a* in a first RO, a second PRACH preamble 220-*b* in a second RO, a third PRACH preamble 220-*c* in a third RO, and a fourth PRACH preamble 220-*d* in a fourth RO. In some aspects, multiple PRACH preambles may coincide with a single RO. In other cases, a quantity of ROs may be referred to as a PRACH association period. Additionally, one or more PRACH association periods may be referred to as a PRACH association pattern.

In some cases, a SSB to RO mapping may be reset at a beginning of each PRACH association pattern (e.g., every 160 ms). In other cases, however, the SSB-RO mapping may be maintained across one or more PRACH association patterns. For example, the UE 115-*a* may continue transmitting the PRACH repetitions in a next PRACH association pattern. Additionally, or alternatively, the UE 115-*a* may stop transmitting a quantity of remaining PRACH repetitions of the PRACH repetitions after a current PRACH association pattern ends. In other examples, the UE 115-*a* may not expect a quantity of the PRACH repetitions to exceed available ROs within a PRACH association pattern.

As described herein, the UE 115-*a* may transmit the PRACH repetitions according to a configuration (e.g., of one or more mapping rules), one or more configurations, or both, associated with mapping a ROs to the PRACH repetitions. For example, for ROs overlapping in a time domain, the UE 115-*a* may transmit repetitions of the PRACH preamble 220 (e.g., the first PRACH preamble 220-*a*, the second PRACH preamble 220-*b*, the third PRACH preamble 220-*c*, and the fourth PRACH preamble 220-*d*) according to frequency resource indices, time resource indices, PRACH slot indices, PRACH association period indices, and the like. In other cases, such as when using ROs that do not overlap in the time domain, the UE 115-*a* may transmit the repetitions of the PRACH preamble 220 (e.g., PRACH preamble 220-*a*, the second PRACH preamble 220-*b*, the third PRACH preamble 220-*c*, and the fourth PRACH preamble 220-*d*) according to an order of time resource indices, an order of PRACH slot indices, and PRACH association period indices. By using the one or more mapping rules, efficient network resource utilization may be realized while increasing the relative likelihood of PRACH preamble reception at the network entity 105-*a*.

Figure 3:
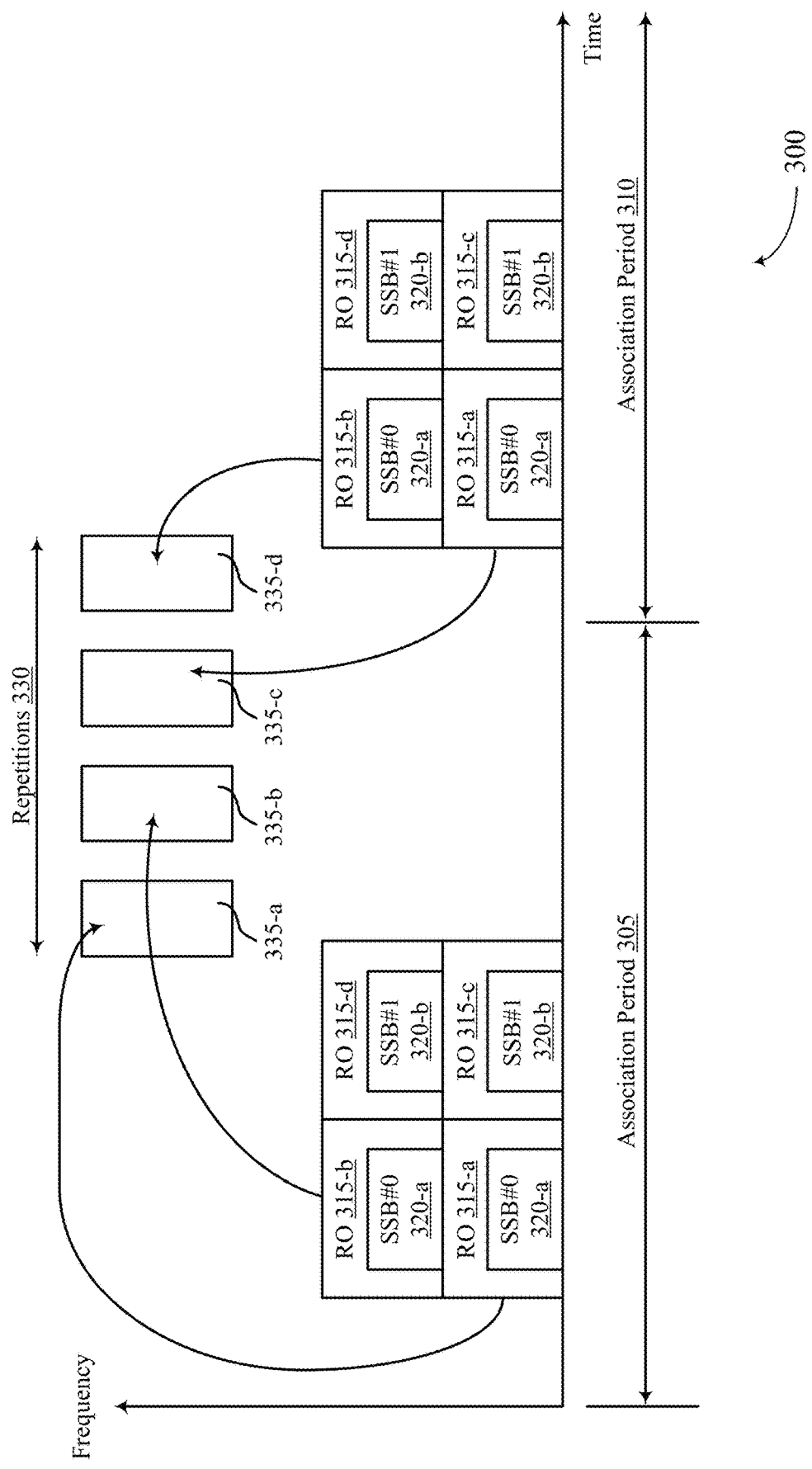
FIG. 3 illustrates an example of a repetition mapping that supports resource mapping for random access repetitions using a same spatial filter in accordance with one or more aspects of the present disclosure.

FIG. 3 illustrates an example of a repetition mapping 300 that supports resource mapping for random access repetitions using a same spatial filter in accordance with one or more aspects of the present disclosure. The repetition mapping 300 may include one or more aspects of the wireless communications system 100 and the wireless communications system 200. For example, the repetition mapping 300 may be implemented or otherwise utilized by a UE and a network entity, which may be examples of the UE 115 and the network entity 105, as described with reference to FIGS. 1 and 2.

A UE may utilize the one or more mapping rules (e.g., or configurations) for one or more types of PRACH procedures. For example, the UE may perform a type of PRACH procedure based on an indication from the network entity. In such cases, the UE may check for a system information block (SIB) message to determine the type of PRACH procedure to perform. For example, the UE may determine, based on the SIB message, that the type of PRACH procedure may correspond to a 2-step PRACH procedure, a 4-step PRACH procedure, or both.

Based on the type of PRACH procedure, the UE may determine resources with which to perform the subsequent messaging associated with the PRACH procedure. For example, if the SIB message indicates that the type of PRACH procedure corresponds to a 4-step RACH procedure, the UE may determine one or more resources, resource mappings, or both, to transmit a first message (e.g., a PRACH preamble) associated with a 4-step procedure. Based on the one or more resources, the UE may initiate the 4-step PRACH procedure. For example, a first step of the 4-step PRACH procedure may correspond to transmitting the PRACH preamble (e.g., message 1 (Msg1)) to the network entity. In some examples, such as those described by the present disclosure, a PRACH preamble may be repeated a number of times (e.g., repetitions 330), for example, to increase the likelihood of the preamble being received by the network.

Based on receiving the PRACH preamble, the network entity may transmit a random access response (RAR) message (e.g., Msg2) to the UE, which may correspond to the second step of the 4-step PRACH procedure. In some cases, Msg2 of the 4-step PRACH procedure may include a timing advance (TA), an uplink grant for a subsequent message, a temporary cell radio network temporary identifier (TC-RNTI), and the like. Based on the received RAR message, the UE may perform a scheduled data transmission (e.g., Msg3) associated with the 4-step PRACH procedure. In some examples, Msg3 may be associated with an RRC connection request, a scheduling request (SR), a buffer status, and the like. In some examples, the scheduled data transmission may correspond to the third step of the 4-step PRACH procedure. Finally, in some examples (e.g., in contention-based random access (CBRA)), the network may transmit a contention resolution message (e.g., Msg4) to the UE, which may correspond to the fourth and final step of the 4-step PRACH procedure. In some examples, Msg4 may correspond to a cellular-radio network temporary identifier (C-RNTI) over PDCCH, a temporary C-RNTI, or both.

In other cases, the UE may determine that a 2-step PRACH procedure is configured. In such cases, the UE may transmit a first message (e.g., MsgA) to the network entity, where the first message may include both the PRACH preamble and the scheduled data transmission (e.g., corresponding to Msg1 and Msg3). In some examples, the PRACH preamble may also be repeated a number of times in the 2-step PRACH procedure to increase the likelihood of the preamble being received by the network. Based on receiving the PRACH preamble of the 2-step PRACH procedure, the network entity may transmit a second message (e.g., MsgB), which may include both the RAR and the contention resolution message (e.g., corresponding to Msg2 and Msg4), if contention is resolved at the network entity.

In yet other cases, the UE may determine that both a 2-step PRACH procedure and a 4-step PRACH procedure may be configured. In such cases, the UE may determine which of the 2-step or 4-step PRACH procedures to utilize. Based on the determination, the UE may perform one or more measurements to determine whether to perform the 2-step PRACH procedure or the 4-step PRACH procedure. For example, the UE may measure an RSRP corresponding to downlink pathloss associated with a message (e.g., msgA-RSRP-Threshold). If the RSRP satisfies a threshold, for example, the UE may perform the 2-step PRACH procedure. Otherwise, the UE may perform the 4-step PRACH procedure.

In any case, in addition to the 2-step or 4-step PRACH procedure configurations, the network entity may further indicate a type of PRACH to be performed. In some cases, the network entity may indicate that the type of PRACH corresponds to a Type 1 RACH procedure, where the UE may be provided a number N of SSB indices associated with a PRACH occasion, physical broadcast channel (PBCH) block indices associated with a PRACH occasion, or both, by the network entity. Additionally, the network entity may also provide the UE with a number R of contention-based preambles per SS/PBCH block indices per valid PRACH occasion via, for example, an ssb-perRACH-OccasioNAndCB-PreamblesPerSSB field within an information element. Based on N, R, the type of RACH procedure, or a combination thereof, the UE may initiate a PRACH procedure.

In some examples, the network entity may indicate, to the UE, that a Type-2 PRACH procedure may be performed. A Type-2 random access procedure may correspond to separate configurations from a Type-1 random access procedure. For example, the network entity may indicate, to the UE, the number N of SS/PBCH block indices associated with a PRACH occasion and a number R of contention-based preambles per SS/PBCH block indices per valid PRACH occasion via a msgA-SSB-PerRACH-OccasionAndCB-PreamblesPerSSB field within an information element, when provided. Otherwise, the number N and the number R may be provided via the ssb-perRACH-OccasionAndCB-PreamblesPerSSB field.

In any case, parameters provided by the network entity for the PRACH procedure may allow the UE to utilize the PRACH occasions to transmit the PRACH preambles (e.g., and their corresponding repetitions, if configured). Additionally, based on indices provided by the network entity, the PRACH occasions used to transmit the contention-based preambles may be mapped to SSBs/PBCHs. For example, one or more PRACH occasions may be associated with a PRACH association period, and multiple PRACH occasions may be associated with PRACH preamble repetitions. In such examples, the PRACH association period may include a mapping between PRACH occasions within the PRACH association period and the SSBs/PBCHs indices indicated by the network entity.

In some cases, the mapping associated with the PRACH association period may reset after the PRACH association period expires. In other cases, the mapping may be preserved over multiple PRACH association periods, which may be referred to as a PRACH association pattern. In such cases, a given PRACH occasion within the PRACH association pattern may be mapped to a SSB index, PBCH index, or both. In some cases (e.g., during a PRACH occasion, a PRACH association period, or a PRACH association pattern), the mapping may allow the network entity, after successfully detecting a PRACH preamble, to determine an SSB, PBCH, or both, associated with the PRACH occasion, where each PRACH occasion may be mapped to a distinct SSB, PBCH, or both. In some examples, such as when the UE is configured to repeat the PRACH preamble for a given quantity of repetitions, each repetition of the PRACH preamble may be associated with a PRACH occasion, and therefore, associated with a quantity of SSBs, PBCH, or both.

For example, FIG. 3 illustrates an association period 305 and an association period 310, where the UE determines SSB to RO mapping for a RACH procedure based on parameters provided by the network, and a configuration indicating the one or more mapping rules for assigning PRACH preambles to ROs 315, repetition numbers, and the like. Additionally, FIG. 3 illustrates frequency multiplexed ROs 315, where the UE may utilize one or more ROs 315 during a common symbol period for PRACH transmissions. For example, the UE may determine, based on signaling from a network entity, that N=2, and a presence of frequency-division multiplexing (FDM) (e.g., msg1-FDM=2). The UE may determine that (e.g., based on the one or more mapping rules), for multiple PRACH transmissions with a same spatial filter which is associated with a suitable SSB or CSI-RS, an order with which to map SSBs to ROs 315, and subsequently how to repeat such PRACH transmissions according to the repetition number.

For example, the UE may determine that the repetitions 330 of PRACH preambles 335-$a$, 335-$b$, 335-$c$, and 335-$d$ (e.g., a same PRACH preamble), which may be associated with ROs 315 associated with a same SSB, may be performed in the following order: first, in increasing order of frequency resource indices for frequency multiplexed PRACH occasions; second, in increasing order of time resource indices for time multiplexed PRACH occasions within a PRACH slot; third, in increasing order of indices for PRACH slots; and fourth, in increasing order of indices for PRACH association periods (e.g., association periods 305 and 310).

For example, ROs 315-*a* and 315-*b* may be mapped to a common SSB 320-*a* (e.g., SSB #0). Additionally, ROs 315-*a* and 315-*b* may be frequency multiplexed to coincide at a common symbol (e.g., or symbols). SSB 320-*a* and RO 315-*a* may be associated with a lowest frequency index (e.g., based on msg1-FDM=2). Based on the frequency index, the UE may map SSB 320-*a* and RO 315-*a* to the (e.g., first) PRACH preamble 335-*a*. Similarly, the UE may determine that SSB 320-*a* and RO 315-*b* may correspond to a next highest frequency index (e.g., during the same symbol period) and subsequently determine to map SSB 320-*a* and RO 315-*b* to the (e.g., second) PRACH preamble 335-*b*.

SSBs 320-*b* (e.g., associated with ROs 315-*c* and 315-*d*), however, may be associated with a different SSB (e.g., SSB #1), and therefore may not be available for mapping to one or more of the repetitions 330. In this example, the UE may determine that a mapping rule (e.g., mapping repetitions in increasing order of time resource indices) may not be available. Further, the UE may determine that subsequent PRACH slots are not available within the same association period 305. That is, the association period 305 may not support the configured repetitions, and cross repetitions across association periods may be implemented. Based on the mapping rule (e.g., increasing order of indices of PRACH association periods), the UE may determine that the common SSB 320-*a* (e.g., mapped to ROs 315-*a* and 315-*b*) in association period 310 may correspond to the same SSB (e.g., SSB #0). Based on the association period 310, and the mapping rule, the UE may map SSB 320-*a* and RO 315-*a* to the (e.g., third) PRACH preamble 335-*c* within the repetitions 330, and SSB 320-*a* and RO 315-*b* to the (e.g., fourth) PRACH preamble 335-*d* within the repetitions 330. Likewise, in association period 310, the UE may not map SSB 320-*b*, as well as RO 315-*c* and RO 315-*d*, because the SSB 320-*b* may correspond another SSB (e.g., SSB #1) different than the common SSB (e.g., SSB #0).

Figure 4:
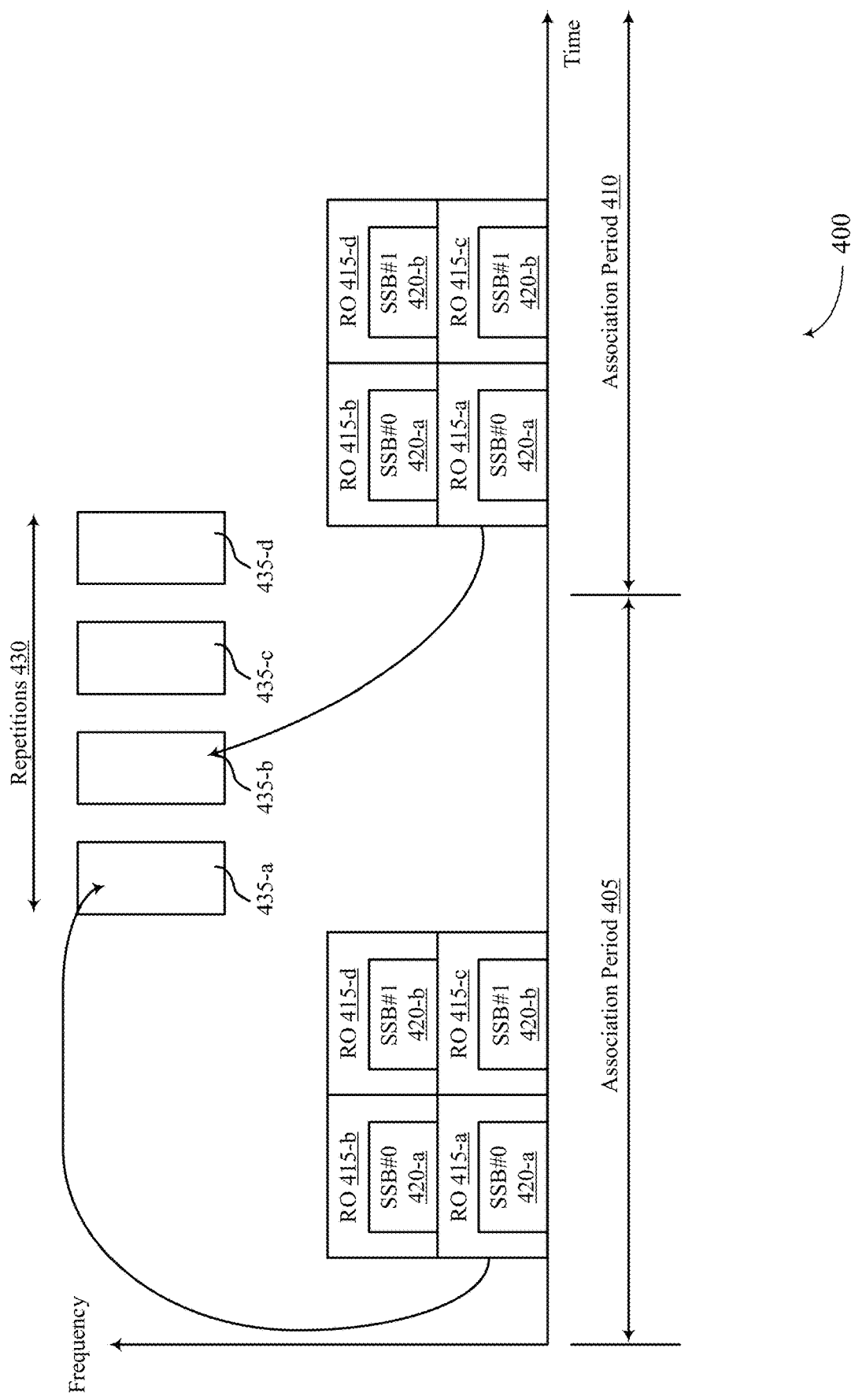
FIG. 4 illustrates an example of a repetition mapping that supports resource mapping for random access repetitions using a same spatial filter in accordance with one or more aspects of the present disclosure.

FIG. 4 illustrates an example of a repetition mapping 400 that supports resource mapping for random access repetitions using a same spatial filter in accordance with one or more aspects of the present disclosure. The repetition mapping 400 may include one or more aspects of the wireless communications system 100 and the wireless communications system 200. For example, the repetition mapping 400 may be implemented or otherwise utilized by a UE and a network entity, which may be examples of the UE 115 and the network entity 105, as described with reference to FIGS. 1 and 2.

FIG. 4 illustrates an association period 405 and an association period 410, where the UE determines SSB to RO mapping for a PRACH procedure based on parameters provided by the network, and a configuration indicating the one or more rules (e.g., one or more mapping rules) for assigning PRACH preambles to ROs 415, repetition numbers, and the like. Additionally, FIG. 4 illustrates frequency multiplexed ROs 415, where the UE may utilize one or more ROs 415 during a common symbol period for PRACH transmissions. For example, the UE may determine, based on signaling from a network entity, that N=2, and a presence of FDM (e.g., msg1-FDM=2). The UE may determine that (e.g., based on the one or more mapping rules), for multiple PRACH transmissions with a same spatial filter which is associated with a suitable SSB or CSI-RS (e.g., strongest SSB), an order with which to map SSBs to ROs, and subsequently how to repeat such PRACH transmissions according to the repetition number.

In some cases, a UE may utilize one PRACH repetition (e.g., of repetitions 430) during a symbol period. For example, similar to examples described in FIG. 3, the UE may receive one or more mapping rules, configuration, or the like, to perform PRACH preamble repetitions with a common SSB (e.g., SSB 420-*a*) to increase a relative likelihood for a network entity to receive one or more PRACH preambles 435. In such cases, the UE may determine that, to increase power of the PRACH repetitions of the repetitions 430, the UE may transmit one repetition per symbol period. For example, the UE may transmit a first PRACH preamble 435-*a* during a first symbol period, a second PRACH preamble 435-*b* during a second symbol period, a third PRACH preamble 435-*c* during a third symbol period, a fourth PRACH preamble 435-*d* during a fourth symbol period, and so forth. In such cases, the one or more mapping rules may be tailored to such a transmission configuration.

For example, the UE may determine that the repetitions 430 of PRACH preambles 435-*a*, 435-*b*, 435-*c*, and 435-*d*, which may be associated with ROs 415 associated with a same SSB 420-*a* (e.g., SSB #0), may be performed in the following order: first, in increasing order of time resource indices for time multiplexed ROs within a PRACH slot; second, in increasing order of indices for PRACH slots; and third, in increasing order of indices for PRACH association periods (e.g., association periods 405 and 410). Such mapping rules may enable the UE to use a total available power for each repetition of the repetitions 430, which may increase the relative likelihood that the network entity receives the repetitions 430.

Based on the one or more mapping rules, the UE may determine that a first SSB 420-*a* (e.g., SSB #0) may be associated with a highest RSRP and is a suitable SSB 420 to map to a valid RO 415-*a* (e.g., ROs available within the association period 405, association period 410, association pattern, etc.). In some examples, the UE may determine which RO 415 of ROs 415-*a* and 415-*b* to utilize, where the UE may use a single RO 415 for the PRACH preamble 435-*a*. For example, the UE may determine to map the SSB 420-*a* and RO 415-*a* to the PRACH preamble 435-*a* in the repetitions 430.

The UE may determine that SSB 420-*b* correspond to a different SSB (e.g., SSB #1) than the first SSB 420-*a*, and therefore refrain from utilizing ROs 415-*c* and 415-*d* for the repetitions 430. Additionally, the UE may determine that further PRACH slot indices do not exist within the association period 405. Therefore, the UE may utilize a mapping rule (e.g., according to association period indices) to determine further repetition mapping.

For example, the UE may determine that SSBs 420-*a*, in the association period 410, correspond to the first SSB (e.g., SSB #0), while ROs 415-*c* and 415-*d* correspond to a different SSB 420-*b* (e.g., SSB #1) than the first SSB 420-*a*. The UE may determine which ROs 415 associated with SSB 420-*a* to use for a second PRACH preamble 435-*b* within the repetitions 430. For example, the UE may determine to utilize RO 415-*a*, corresponding to SSB 420-*a*, for a second PRACH preamble 435-*b* within the repetitions 430. The UE may utilize subsequent SSBs 420 and ROs 415 within the association period 410, within other association periods, other association patterns, and the like, to complete the repetitions 430.

Figure 5:
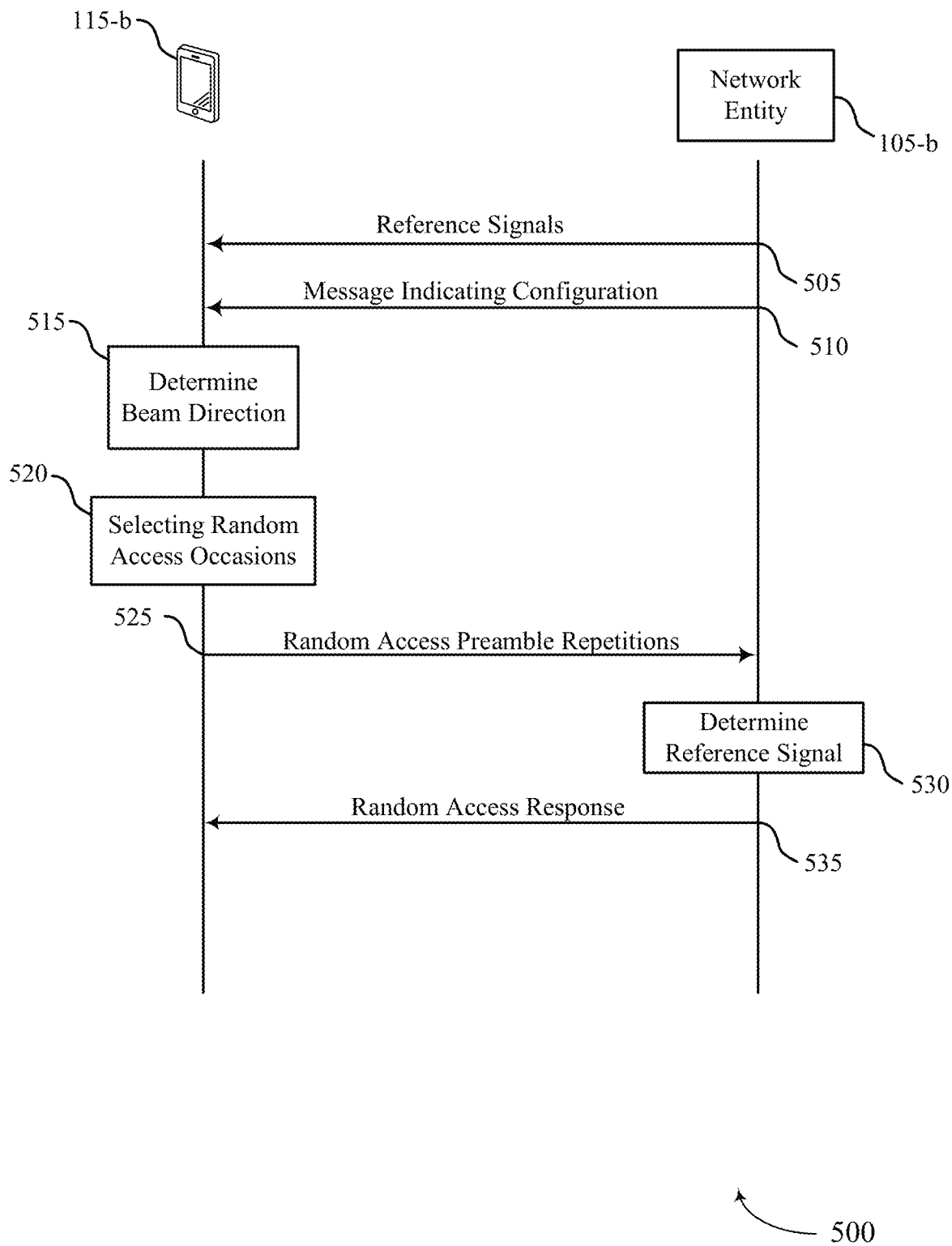
FIG. 5 illustrates an example of a process flow that supports resource mapping for random access repetitions using a same spatial filter in accordance with one or more aspects of the present disclosure.

FIG. 5 illustrates an example of a process flow 500 in a system that supports resource mapping for random access repetitions using a same spatial filter in accordance with one or more aspects of the present disclosure. The process flow may implement one or more aspects of the wireless communications systems 100 and 200. For example, the process flow 500 may be implemented by a UE 115-*b* and a network entity 105-*b*, which may be examples of the UE 115 and the network entity 105 as described with reference to FIGS. 1 and 2. Additionally, the process flow 500 may further describe techniques discussed with reference to FIGS. 3 and 4. It should be noted that, while exemplary steps are described with reference to the process flow 500, any number of steps may be added or omitted, and may be performed in a different order, or with different devices, than shown in FIG. 5.

The network entity 105-*b* may communicate with the UE 115-*b*. For example, at 505, the network entity 105-*b* may transmit reference signals to the UE 115-*b*. The reference signals may correspond to SSBs, CSI-RS, or the like. Additionally, at 510, the network entity 105-*b* may transmit a message indicating a configuration indicating a quantity of repetitions, one or more mapping rules for mapping and performing the repetitions, and the like. In some examples, the UE 115-*b* may receive, from the network entity 105-*b*, multiple configurations, each configuration corresponding to different mapping rules supporting frequency multiplexed repetitions, repetitions on a single symbol (e.g., for total power usage at the UE 115-*b*), or both.

At 515, the UE 115-*b* may perform one or more measurements on the reference signals (e.g., determining SINR, SNR, RSRP) to determine a beam direction (e.g., a best spatial filter). The UE 115-*b* may utilize the spatial filter for performing such repetitions during a 2-step PRACH procedure, 4-step PRACH procedure, or both, in accordance with the configuration. For example, at 520, the UE 115-*b* may select random access occasions (e.g., ROs) for performing repetitions of PRACH preambles. For example, the UE 115-*b* may determine to use a set of mapping rules (e.g., as described with reference to FIG. 3), where the UE 115-*b* may map the best SSB to ROs according to an increasing order of frequency resource indices for frequency multiplexed PRACH occasions, in increasing order of time resources indices for time multiplexed PRACH occasions within a PRACH slot, in increasing order of indices for PRACH slots, and in increasing order of indices for PRACH association periods.

Alternatively, the UE 115-*b* may determine to utilize one PRACH repetition per symbol period (e.g., to utilize total available power). In such cases, the UE 115-*b* may use a set of mapping rules (e.g., as described with reference to FIG. 4), where the UE 115-*b* may map the SSB to ROs according to an increasing order of time resource indices for time multiplexed PRACH occasions within a PRACH slot, in increasing order of indices for PRACH slots, and increasing order of indices for PRACH association periods. In any case, at 525, the UE 115-*b* may perform random access preamble repetitions by transmitting repetitions to the network entity 105-*b* (e.g., such as in 2-step RACH or 4-step RACH).

At 530, based on the random access preamble repetitions at 525, the network entity may determine a reference signal associated with the random access preamble repetitions (e.g., the best SSB mapped to ROs used for the random access preamble repetitions). Based on determining the reference signal, at 535, the network entity 105-*b* may transmit a random access response (e.g., for 2-step or 4-step RACH).

Figure 6:
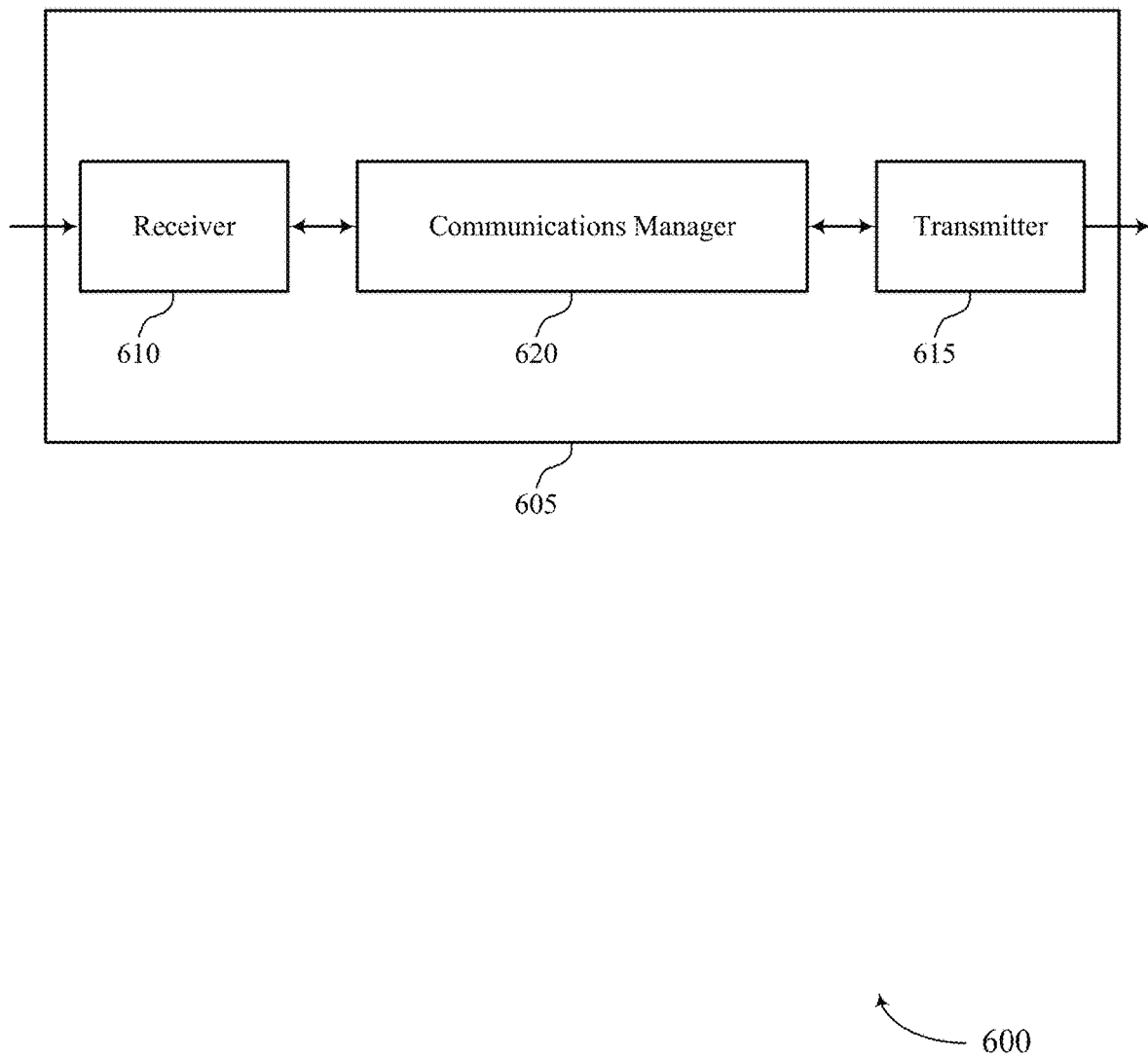
FIGS. 6 and 7 show block diagrams of devices that support resource mapping for random access repetitions using a same spatial filter in accordance with one or more aspects of the present disclosure.

FIG. 6 shows a block diagram 600 of a device 605 that supports resource mapping for random access repetitions using a same spatial filter in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to resource mapping for random access repetitions using a same spatial filter). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to resource mapping for random access repetitions using a same spatial filter). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of resource mapping for random access repetitions using a same spatial filter as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. For example, the communications manager 620 may be configured as or otherwise support a means for receiving a message indicating a configuration for repeating transmissions of a first random access message of a random access procedure. The communications manager 620 may be configured as or otherwise support a means for selecting a set of random access occasions for a quantity of repetitions of the first random access message in accordance with the configuration and a mapping rule, where the mapping rule is based on resources associated with each random access occasion of the set of random access occasions. The communications manager 620 may be configured as or otherwise support a means for transmitting the quantity of repetitions of the first random access message using a same spatial filter via the set of random access occasions.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced processing power consumption by leveraging one or more mapping rules for performing PRACH repetitions.

Figure 7:
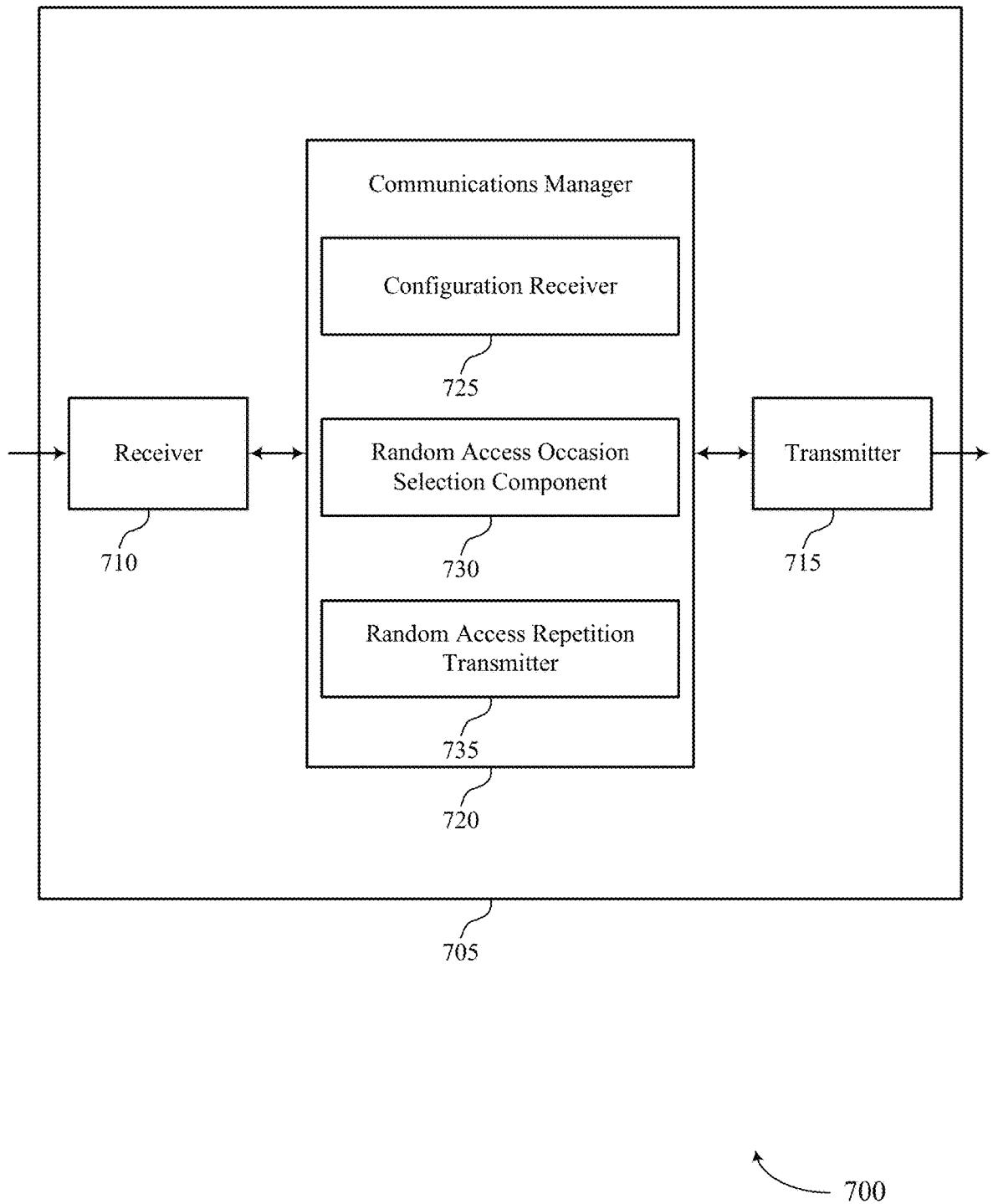

FIG. 7 shows a block diagram 700 of a device 705 that supports resource mapping for random access repetitions using a same spatial filter in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to resource mapping for random access repetitions using a same spatial filter). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to resource mapping for random access repetitions using a same spatial filter). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of resource mapping for random access repetitions using a same spatial filter as described herein. For example, the communications manager 720 may include a configuration receiver 725, a random access occasion selection component 730, a random access repetition transmitter 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The configuration receiver 725 may be configured as or otherwise support a means for receiving a message indicating a configuration for repeating transmissions of a first random access message of a random access procedure. The random access occasion selection component 730 may be configured as or otherwise support a means for selecting a set of random access occasions for a quantity of repetitions of the first random access message in accordance with the configuration and a mapping rule, where the mapping rule is based on resources associated with each random access occasion of the set of random access occasions. The random access repetition transmitter 735 may be configured as or otherwise support a means for transmitting the quantity of repetitions of the first random access message using a same spatial filter via the set of random access occasions.

Figure 8:
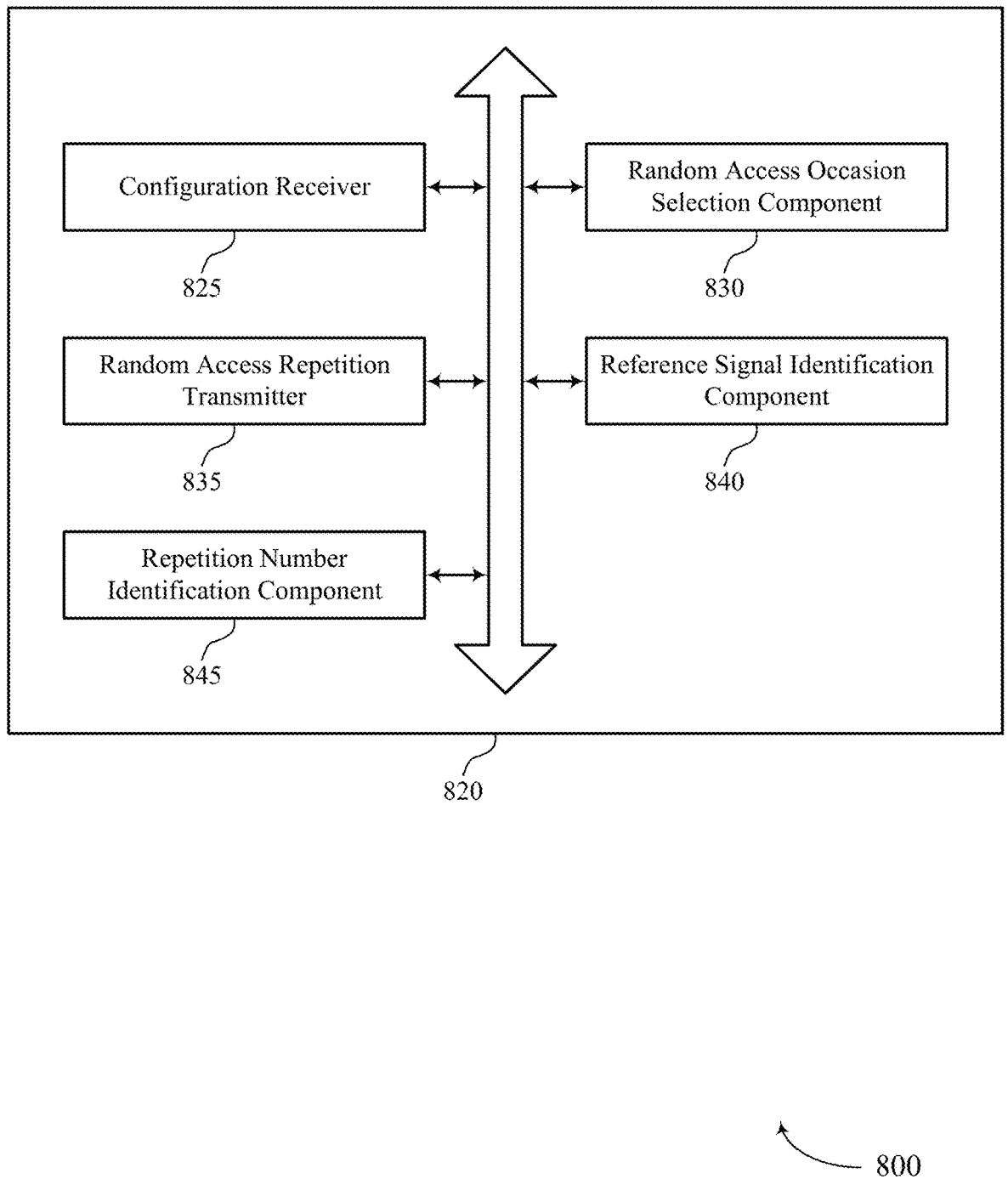
FIG. 8 shows a block diagram of a communications manager that supports resource mapping for random access repetitions using a same spatial filter in accordance with one or more aspects of the present disclosure.

FIG. 8 shows a block diagram 800 of a communications manager 820 that supports resource mapping for random access repetitions using a same spatial filter in accordance with one or more aspects of the present disclosure. The communications manager 820 may be an example of aspects of a communications manager 620, a communications manager 720, or both, as described herein. The communications manager 820, or various components thereof, may be an example of means for performing various aspects of resource mapping for random access repetitions using a same spatial filter as described herein. For example, the communications manager 820 may include a configuration receiver 825, a random access occasion selection component 830, a random access repetition transmitter 835, a reference signal identification component 840, a repetition number identification component 845, or any combination thereof. Each of these components may communicate, directly or indirectly, with one another (e.g., via one or more buses).

The communications manager 820 may support wireless communications at a UE in accordance with examples as disclosed herein. The configuration receiver 825 may be configured as or otherwise support a means for receiving a message indicating a configuration for repeating transmissions of a first random access message of a random access procedure. The random access occasion selection component 830 may be configured as or otherwise support a means for selecting a set of random access occasions for a quantity of repetitions of the first random access message in accordance with the configuration and a mapping rule, where the mapping rule is based on resources associated with each random access occasion of the set of random access occasions. The random access repetition transmitter 835 may be configured as or otherwise support a means for transmitting the quantity of repetitions of the first random access message using a same spatial filter via the set of random access occasions.

In some examples, to support selecting the set of random access occasions in accordance with the mapping rule, the reference signal identification component 840 may be configured as or otherwise support a means for identifying a synchronization signal block from a set of synchronization signal blocks, a channel state information reference signal, or both. In some examples, to support selecting the set of random access occasions in accordance with the mapping rule, the random access occasion selection component 830 may be configured as or otherwise support a means for selecting the set of random access occasions based on an association between the set of random access occasions, the synchronization signal block, the channel state information reference signal, or a combination thereof.

In some examples, to support selecting the set of random access occasions in accordance with the mapping rule, the random access occasion selection component 830 may be configured as or otherwise support a means for selecting one or more first random access occasions based on a respective frequency-domain index of the resources associated with each random access occasion of the set of random access occasions.

In some examples, to support selecting the set of random access occasions in accordance with the mapping rule, the random access occasion selection component 830 may be configured as or otherwise support a means for selecting one or more second random access occasions based on a respective time-domain index of the resources associated with each random access occasion of the set of random access occasions, the one or more second random access occasions being included in a same slot.

In some examples, to support selecting the set of random access occasions in accordance with the mapping rule, the random access occasion selection component 830 may be configured as or otherwise support a means for selecting one or more third random access occasions based on a respective slot index of the resources associated with each random access occasion of the set of random access occasions.

In some examples, to support selecting the set of random access occasions in accordance with the mapping rule, the random access occasion selection component 830 may be configured as or otherwise support a means for selecting one or more fourth random access occasions based on a respective association period index of the resources associated with each random access occasion of the set of random access occasions.

In some examples, to support selecting the set of random access occasions in accordance with the mapping rule, the reference signal identification component 840 may be configured as or otherwise support a means for identifying a synchronization signal block from a set of synchronization signal blocks, a channel state information reference signal, or both. In some examples, to support selecting the set of random access occasions in accordance with the mapping rule, the random access occasion selection component 830 may be configured as or otherwise support a means for selecting the set of random access occasions based on an association between the set of random access occasions, the synchronization signal block, the channel state information reference signal, or a combination thereof, where respective random access occasions of the set of random access occasions are non-overlapping in time.

In some examples, to support selecting the set of random access occasions in accordance with the mapping rule, the random access occasion selection component 830 may be configured as or otherwise support a means for selecting one or more first random access occasions based on a respective time-domain index of the resources associated with each random access occasion of the set of random access occasions, the one or more first random access occasions being included in a same slot.

In some examples, to support selecting the set of random access occasions in accordance with the mapping rule, the random access occasion selection component 830 may be configured as or otherwise support a means for selecting one or more second random access occasions based on a respective slot index of the resources associated with each random access occasion of the set of random access occasions.

In some examples, to support selecting the set of random access occasions in accordance with the mapping rule, the random access occasion selection component 830 may be configured as or otherwise support a means for selecting one or more third random access occasions based on a respective association period index of the resources associated with each random access occasion of the set of random access occasions.

In some examples, the repetition number identification component 845 may be configured as or otherwise support a means for identifying the quantity of repetitions of the first random access message based on the configuration, where the quantity of repetitions of the first random access message is the same as a quantity of possible retransmissions of the first random access message.

In some examples, the repetition number identification component 845 may be configured as or otherwise support a means for identifying the quantity of repetitions of the first random access message based on the configuration, where the quantity of repetitions of the first random access message is different than a quantity of possible retransmissions of the first random access message.

In some examples, the mapping rule includes a first mapping rule for respective random access occasions of the set of random access occasions that overlap in time or a second mapping rule for the respective random access occasions of the set of random access occasions that are non-overlapping in time, and the configuration receiver 825 may be configured as or otherwise support a means for receiving a second message configuring the UE with the first mapping rule or the second mapping rule.

In some examples, the message includes a radio resource control message or a system information message, or any combination thereof.

In some examples, to support transmitting the quantity of repetitions of the first random access message, the random access repetition transmitter 835 may be configured as or otherwise support a means for transmitting the quantity of repetitions of the first random access message across two or more association patterns based on a quantity of random access occasions in the set of random access occasions.

In some examples, to support transmitting the quantity of repetitions of the first random access message, the random access repetition transmitter 835 may be configured as or otherwise support a means for transmitting an initial portion of the quantity of repetitions of the first random access message during a current association pattern based on a quantity of random access occasions in the set of random access occasions. In some examples, to support transmitting the quantity of repetitions of the first random access message, the random access repetition transmitter 835 may be configured as or otherwise support a means for stopping transmission of a remaining portion of the quantity of repetitions of the first random access message after the current association pattern ends.

In some examples, the quantity of repetitions of the first random access message are transmitted within a single association pattern. In some examples, the random access procedure includes a four-step random access procedure or a two-step random access procedure.

Figure 9:
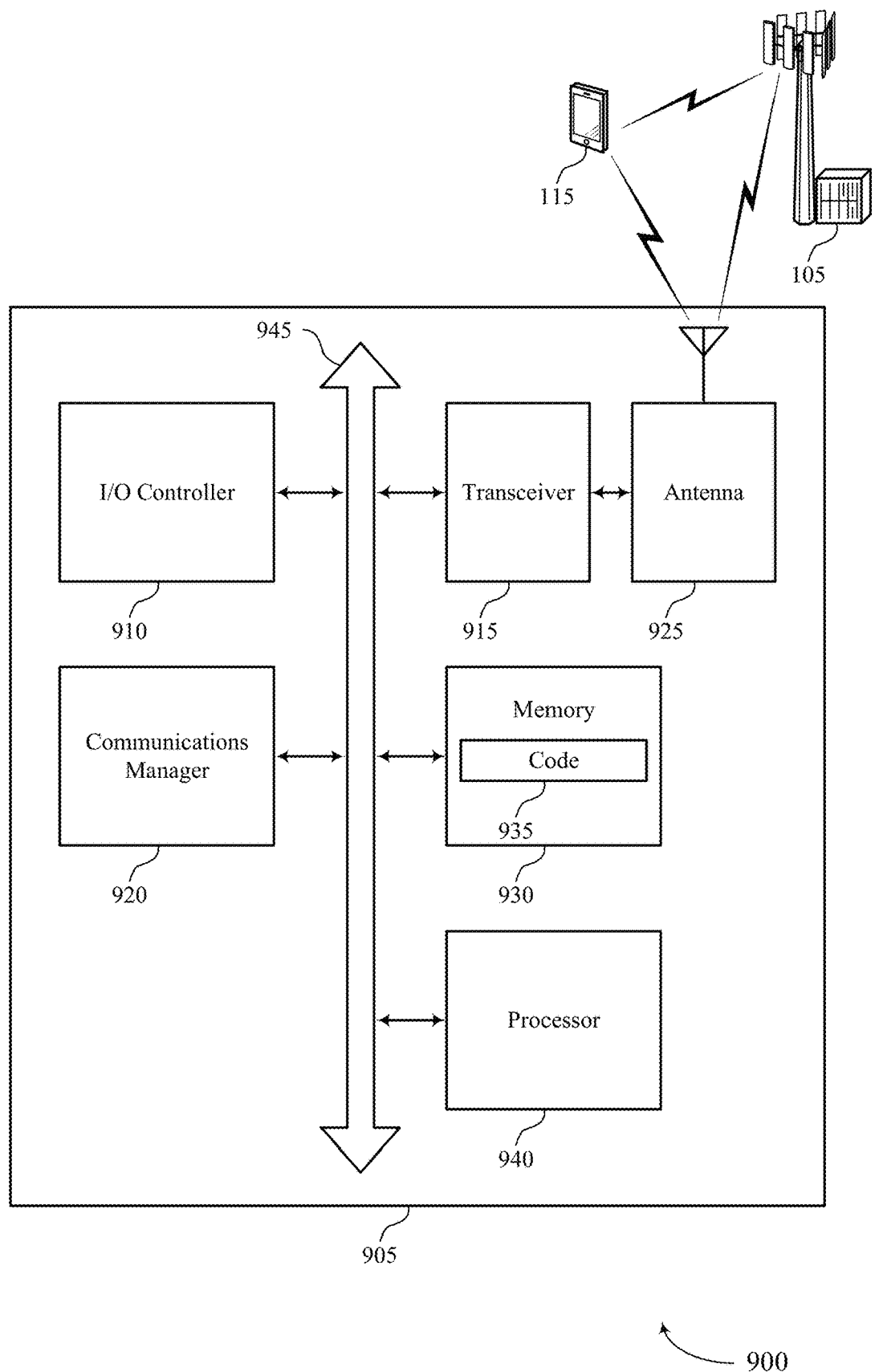
FIG. 9 shows a diagram of a system including a device that supports resource mapping for random access repetitions using a same spatial filter in accordance with one or more aspects of the present disclosure.

FIG. 9 shows a diagram of a system 900 including a device 905 that supports resource mapping for random access repetitions using a same spatial filter in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting resource mapping for random access repetitions using a same spatial filter). For example, the device 905 or a component of the device 905 may include a processor 940 and memory 930 coupled with or to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving a message indicating a configuration for repeating transmissions of a first random access message of a random access procedure. The communications manager 920 may be configured as or otherwise support a means for selecting a set of random access occasions for a quantity of repetitions of the first random access message in accordance with the configuration and a mapping rule, where the mapping rule is based on resources associated with each random access occasion of the set of random access occasions. The communications manager 920 may be configured as or otherwise support a means for transmitting the quantity of repetitions of the first random access message using a same spatial filter via the set of random access occasions.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, and the like, by utilizing one or more rules to perform PRACH repetitions.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of resource mapping for random access repetitions using a same spatial filter as described herein, or the processor 940 and the memory 930 may be otherwise configured to perform or support such operations.

Figure 10:
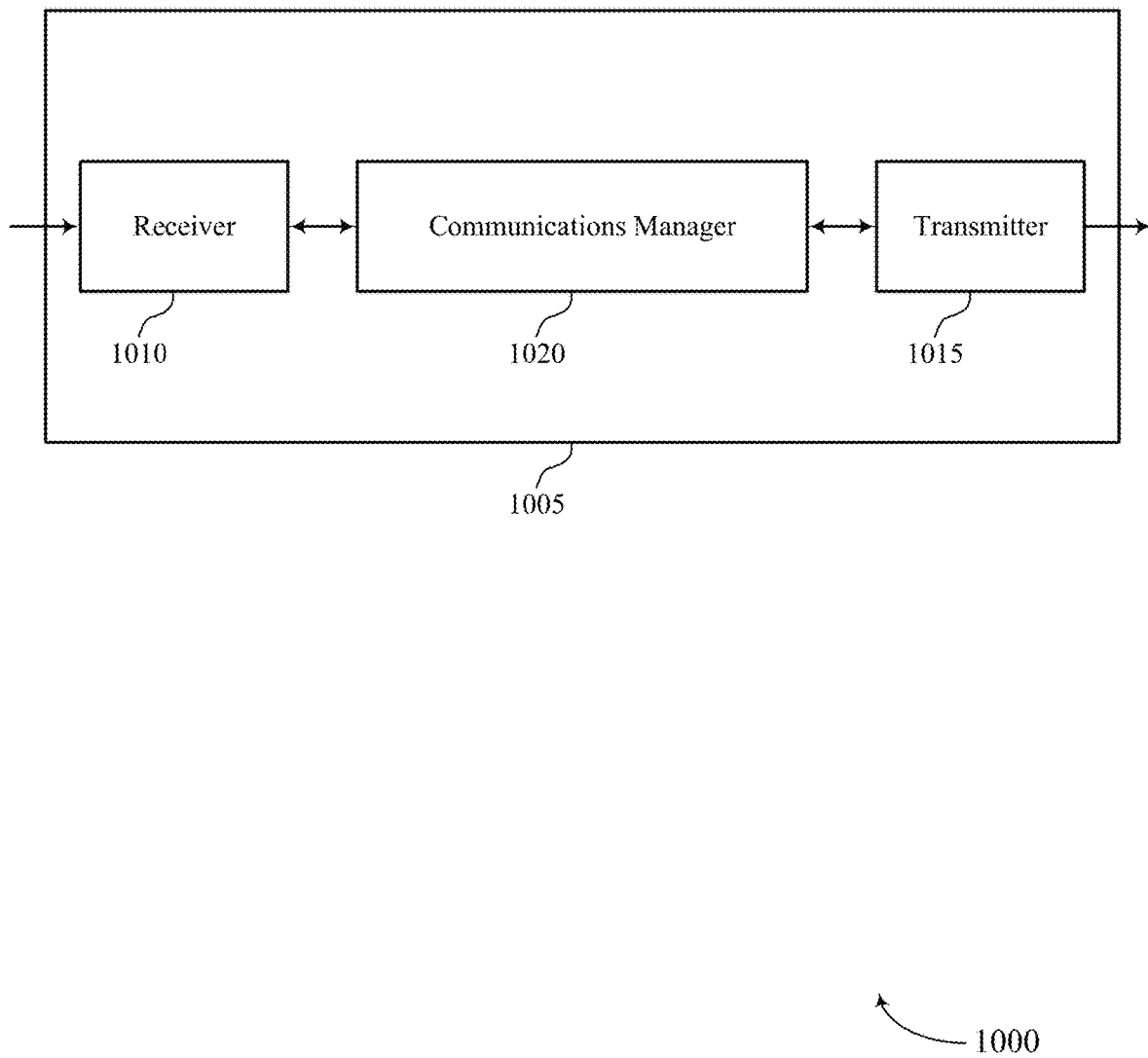
FIGS. 10 and 11 show block diagrams of devices that support resource mapping for random access repetitions using a same spatial filter in accordance with one or more aspects of the present disclosure.

FIG. 10 shows a block diagram 1000 of a device 1005 that supports resource mapping for random access repetitions using a same spatial filter in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of resource mapping for random access repetitions using a same spatial filter as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. For example, the communications manager 1020 may be configured as or otherwise support a means for transmitting a message indicating a configuration for repeating transmissions of a first random access message of a random access procedure. The communications manager 1020 may be configured as or otherwise support a means for receiving, using a same spatial filter, a quantity of repetitions of the first random access message over a set of random access occasions based on the configuration, the set of random access occasions are based on a mapping rule, where the mapping rule is based on resources associated with each random access occasion of the set of random access occasions.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced processing power consumption by utilizing one or more rules for PRACH repetitions.

Figure 11:
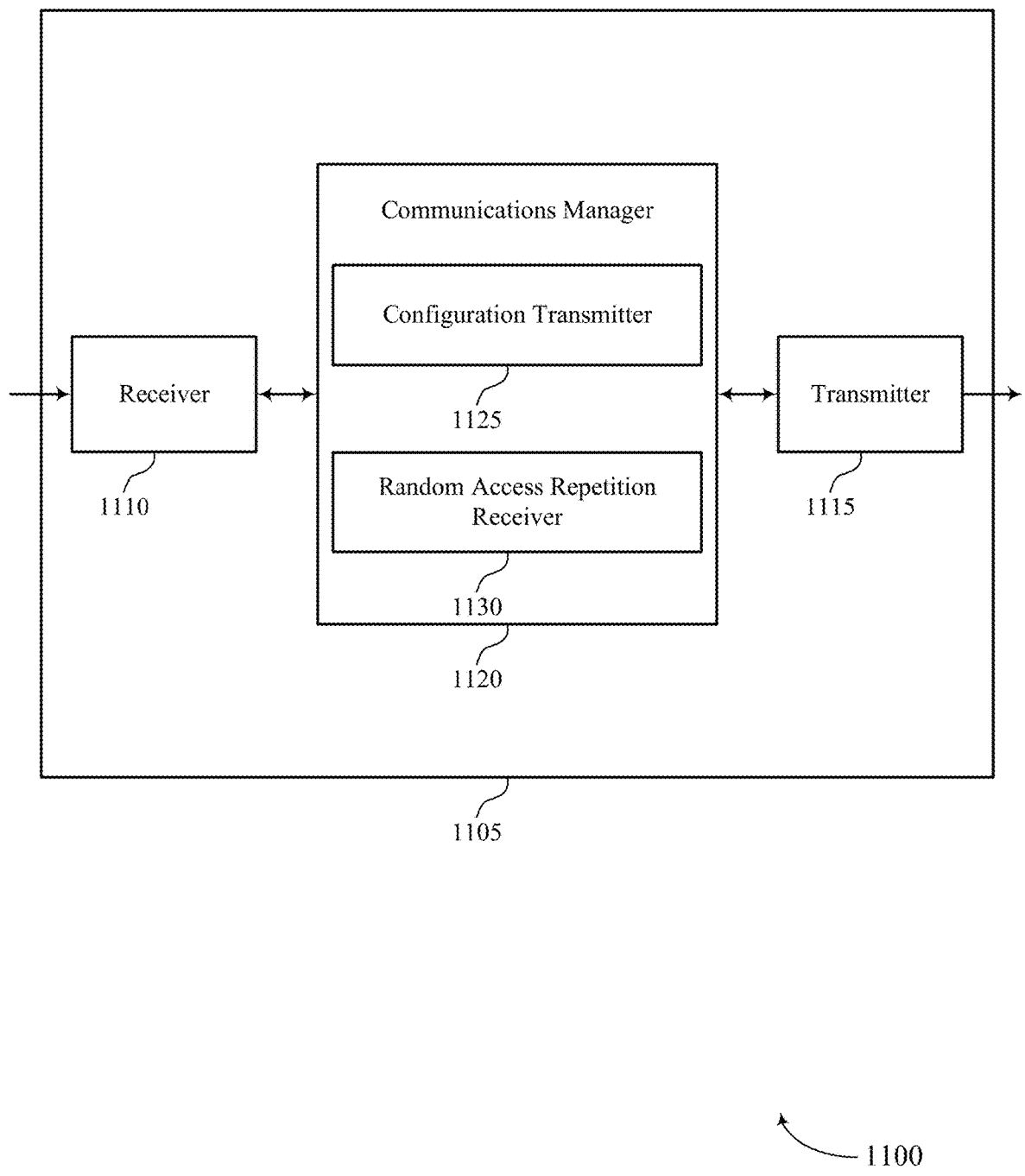

FIG. 11 shows a block diagram 1100 of a device 1105 that supports resource mapping for random access repetitions using a same spatial filter in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of resource mapping for random access repetitions using a same spatial filter as described herein. For example, the communications manager 1120 may include a configuration transmitter 1125 a random access repetition receiver 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. The configuration transmitter 1125 may be configured as or otherwise support a means for transmitting a message indicating a configuration for repeating transmissions of a first random access message of a random access procedure. The random access repetition receiver 1130 may be configured as or otherwise support a means for receiving, using a same spatial filter, a quantity of repetitions of the first random access message over a set of random access occasions based on the configuration, the set of random access occasions are based on a mapping rule, where the mapping rule is based on resources associated with each random access occasion of the set of random access occasions.

Figure 12:
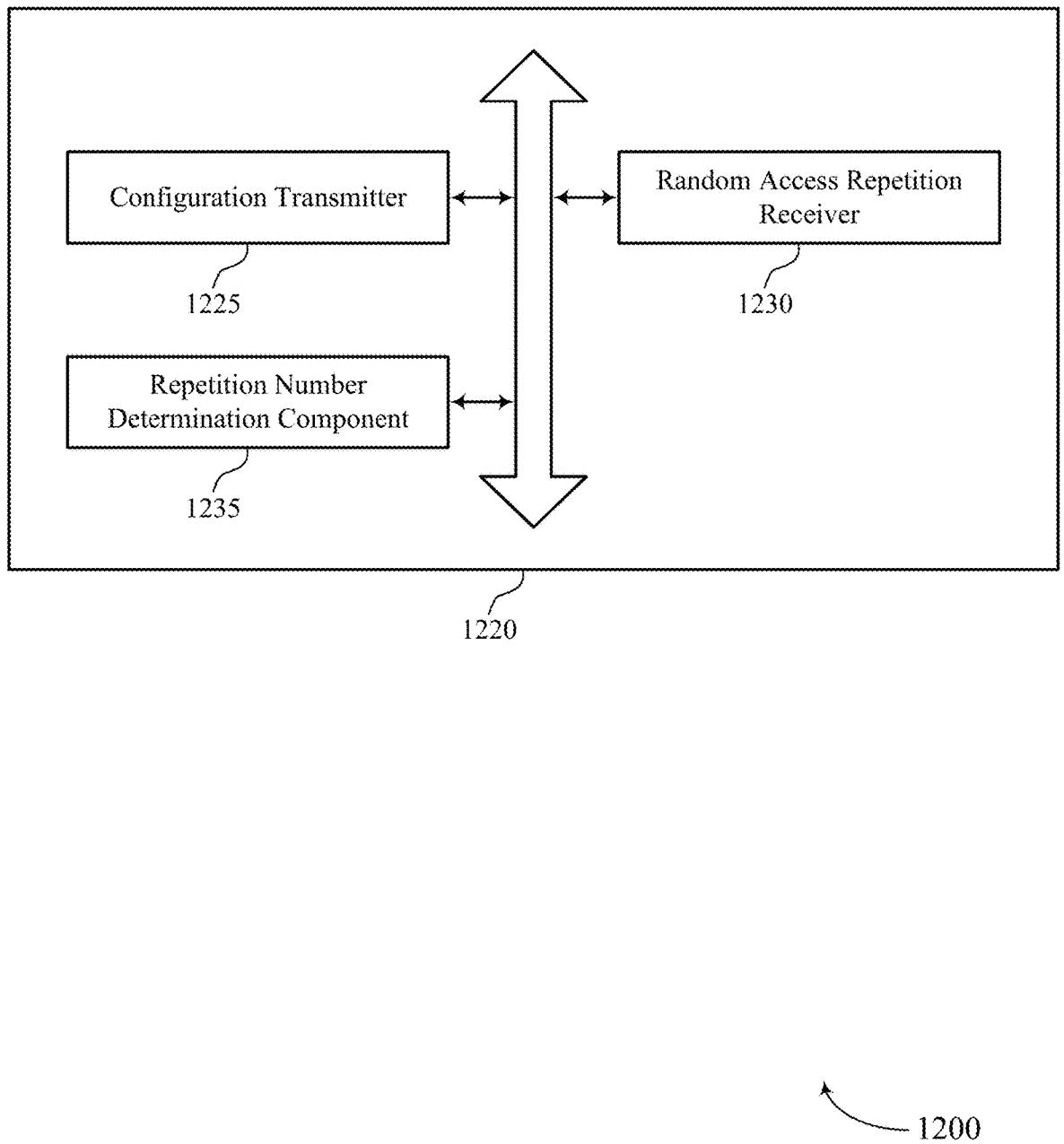
FIG. 12 shows a block diagram of a communications manager that supports resource mapping for random access repetitions using a same spatial filter in accordance with one or more aspects of the present disclosure.

FIG. 12 shows a block diagram 1200 of a communications manager 1220 that supports resource mapping for random access repetitions using a same spatial filter in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of resource mapping for random access repetitions using a same spatial filter as described herein. For example, the communications manager 1220 may include a configuration transmitter 1225, a random access repetition receiver 1230, a repetition number determination component 1235, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network entity in accordance with examples as disclosed herein. The configuration transmitter 1225 may be configured as or otherwise support a means for transmitting a message indicating a configuration for repeating transmissions of a first random access message of a random access procedure. The random access repetition receiver 1230 may be configured as or otherwise support a means for receiving, using a same spatial filter, a quantity of repetitions of the first random access message over a set of random access occasions based on the configuration, the set of random access occasions are based on a mapping rule, where the mapping rule is based on resources associated with each random access occasion of the set of random access occasions.

In some examples, the set of random access occasions are based on an association between the set of random access occasions and a same synchronization signal block or a same channel state information reference signal.

In some examples, the set of random access occasions are based on a respective frequency-domain index of the resources associated with each random access occasion, or a respective time-domain index of the resources associated with each random access occasion of the set of random access occasions, or a respective slot index of the resources associated with each random access occasion of the set of random access occasions, or a respective association period index of the resources associated with each random access occasion of the set of random access occasions, or any combination thereof.

In some examples, the repetition number determination component 1235 may be configured as or otherwise support a means for determining the quantity of repetitions of the first random access message, the quantity of repetitions of the first random access message being the same as a quantity of possible retransmissions of the first random access message, where the configuration indicates the quantity of repetitions.

In some examples, the repetition number determination component 1235 may be configured as or otherwise support a means for determining the quantity of repetitions of the first random access message, the quantity of repetitions of the first random access message being different than a quantity of possible retransmissions of the first random access message, where the configuration indicates the quantity of repetitions.

In some examples, the mapping rule includes a first mapping rule for respective random access occasions of the set of random access occasions that overlap in time or a second mapping rule for the respective random access occasions of the set of random access occasions that are non-overlapping in time, and the configuration transmitter 1225 may be configured as or otherwise support a means for transmitting a second message configuring a UE with the first mapping rule or the second mapping rule.

In some examples, the message includes a radio resource control message or a system information message, or any combination thereof.

In some examples, to support receiving the quantity of repetitions of the first random access message, the random access repetition receiver 1230 may be configured as or otherwise support a means for receiving the quantity of repetitions of the first random access message across two or more association patterns based on a quantity of random access occasions in the set of random access occasions.

In some examples, to support receiving the quantity of repetitions of the first random access message, the random access repetition receiver 1230 may be configured as or otherwise support a means for receiving an initial portion of the quantity of repetitions of the first random access message during a current association pattern based on a quantity of random access occasions in the set of random access occasions, where a remaining portion of the quantity of repetitions of the first random access message are not received after the current association pattern ends.

In some examples, the quantity of repetitions of the first random access message are received within a single association pattern.

Figure 13:
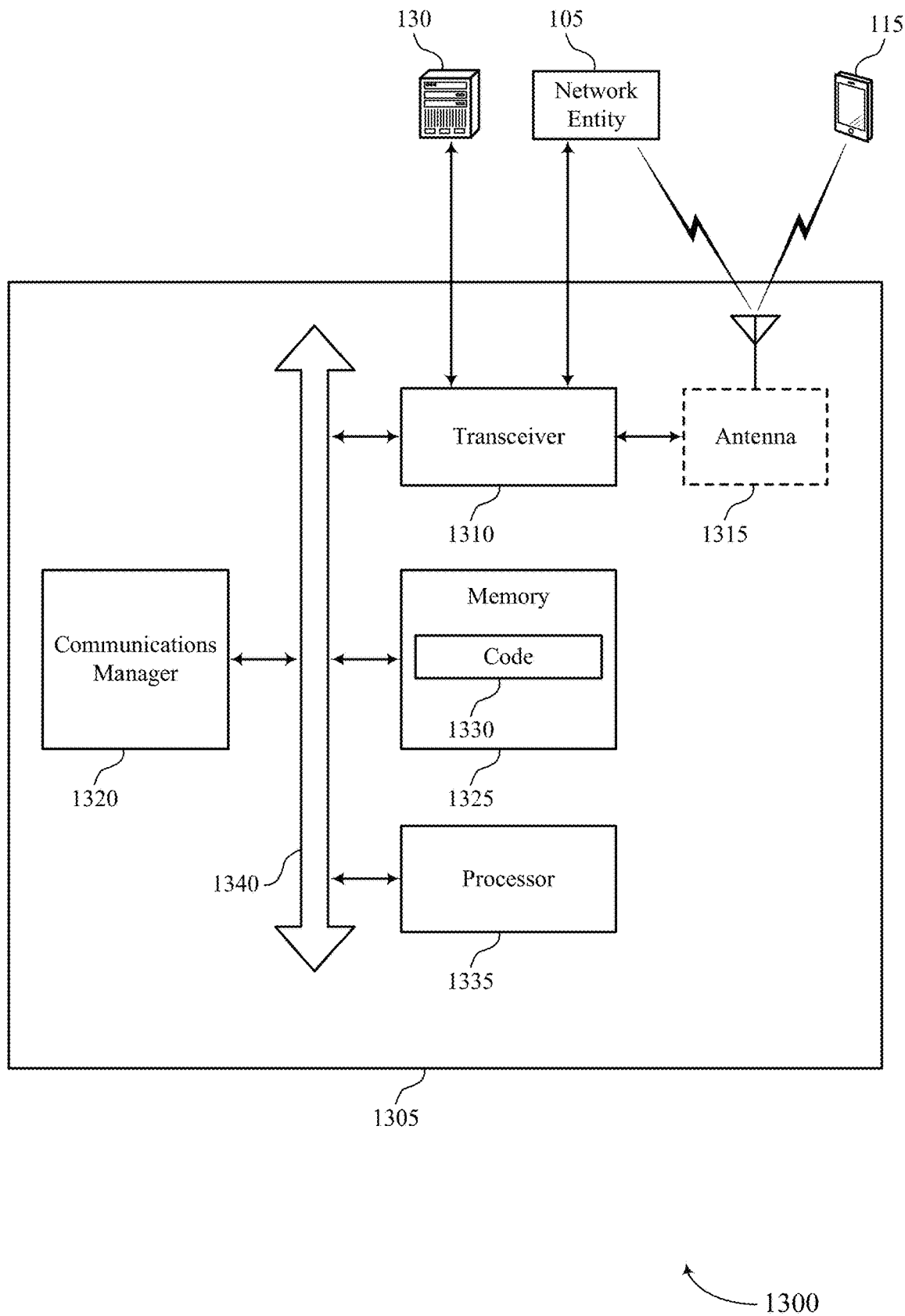
FIG. 13 shows a diagram of a system including a device that supports resource mapping for random access repetitions using a same spatial filter in accordance with one or more aspects of the present disclosure.

FIG. 13 shows a diagram of a system 1300 including a device 1305 that supports resource mapping for random access repetitions using a same spatial filter in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting resource mapping for random access repetitions using a same spatial filter). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a network entity in accordance with examples as disclosed herein. For example, the communications manager 1320 may be configured as or otherwise support a means for transmitting a message indicating a configuration for repeating transmissions of a first random access message of a random access procedure. The communications manager 1320 may be configured as or otherwise support a means for receiving, using a same spatial filter, a quantity of repetitions of the first random access message over a set of random access occasions based on the configuration, the set of random access occasions are based on a mapping rule, where the mapping rule is based on resources associated with each random access occasion of the set of random access occasions.

By including or configuring the communications manager 1320 in accordance with examples as described herein, the device 1305 may support techniques for improved communication reliability, reduced latency, improved user experience related to reduced processing, reduced power consumption, more efficient utilization of communication resources, improved coordination between devices, and the like, by utilizing one or more rules for performing PRACH repetitions.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of resource mapping for random access repetitions using a same spatial filter as described herein, or the processor 1335 and the memory 1325 may be otherwise configured to perform or support such operations.

Figure 14:
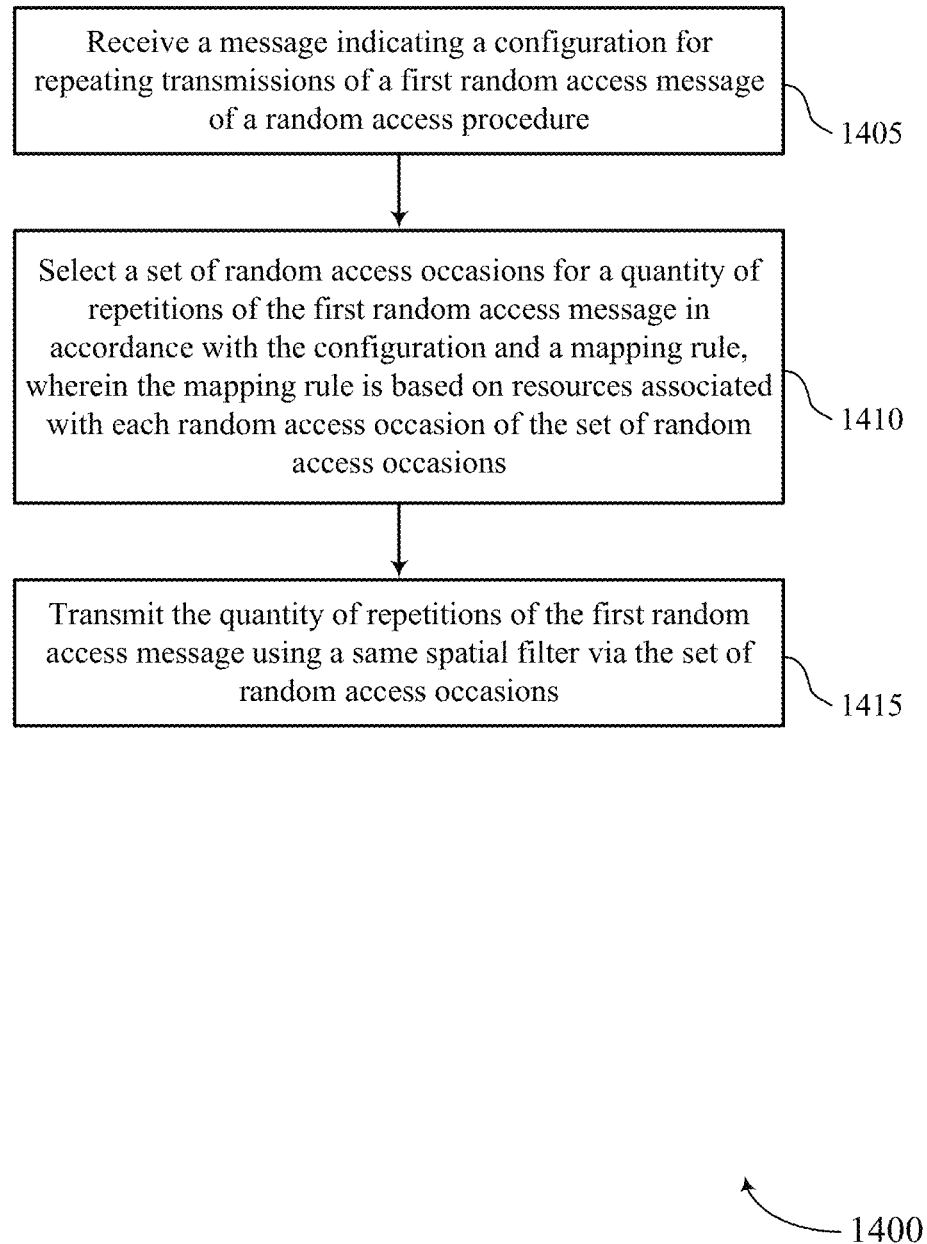
FIGS. 14 through 17 show flowcharts illustrating methods that support resource mapping for random access repetitions using a same spatial filter in accordance with one or more aspects of the present disclosure.

FIG. 14 shows a flowchart illustrating a method 1400 that supports resource mapping for random access repetitions using a same spatial filter in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a message indicating a configuration for repeating transmissions of a first random access message of a random access procedure. The operations of 1405 may be performed in accordance with examples as disclosed herein. In some examples, aspects of the operations of 1405 may be performed by a configuration receiver 825 as described with reference to FIG. 8.

At 1410, the method may include selecting a set of random access occasions for a quantity of repetitions of the first random access message in accordance with the configuration and a mapping rule, where the mapping rule is based on resources associated with each random access occasion of the set of random access occasions. The operations of 1410 may be performed in accordance with examples as disclosed herein. In some examples, aspects of the operations of 1410 may be performed by a random access occasion selection component 830 as described with reference to FIG. 8.

At 1415, the method may include transmitting the quantity of repetitions of the first random access message using a same spatial filter via the set of random access occasions. The operations of 1415 may be performed in accordance with examples as disclosed herein. In some examples, aspects of the operations of 1415 may be performed by a random access repetition transmitter 835 as described with reference to FIG. 8.

Figure 15:
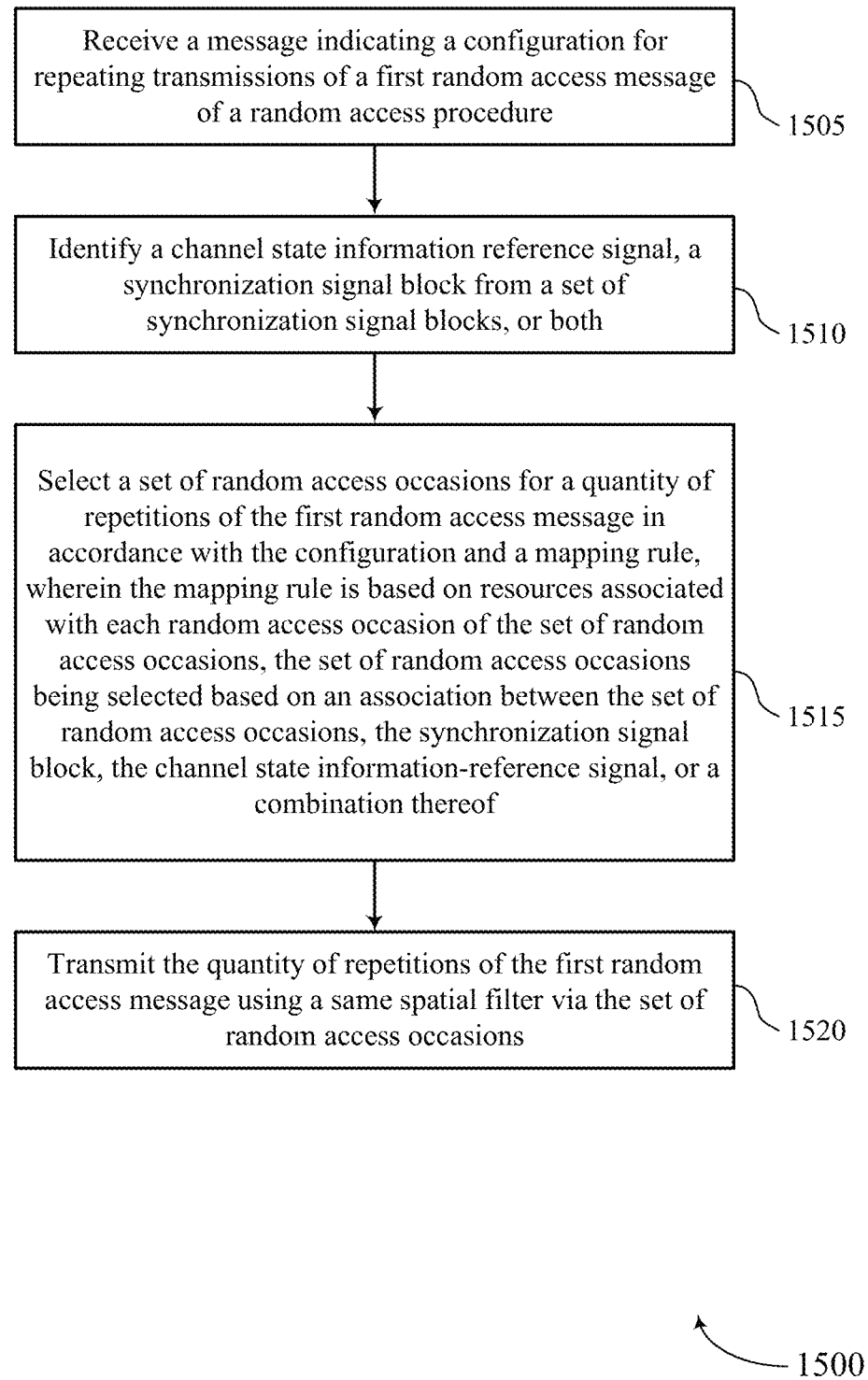

FIG. 15 shows a flowchart illustrating a method 1500 that supports resource mapping for random access repetitions using a same spatial filter in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving a message indicating a configuration for repeating transmissions of a first random access message of a random access procedure. The operations of 1505 may be performed in accordance with examples as disclosed herein. In some examples, aspects of the operations of 1505 may be performed by a configuration receiver 825 as described with reference to FIG. 8.

At 1510, the method may include identifying a synchronization signal block from a set of synchronization signal blocks, a channel state information reference signal, or both. The operations of 1510 may be performed in accordance with examples as disclosed herein. In some examples, aspects of the operations of 1510 may be performed by a reference signal identification component 840 as described with reference to FIG. 8.

At 1515, the method may include selecting a set of random access occasions for a quantity of repetitions of the first random access message in accordance with the configuration and a mapping rule, where the mapping rule is based on resources associated with each random access occasion of the set of random access occasions, the set of random access occasions being selected based on an association between the set of random access occasions, the synchronization signal block, the channel state information reference signal, or a combination thereof. The operations of 1515 may be performed in accordance with examples as disclosed herein. In some examples, aspects of the operations of 1515 may be performed by a random access occasion selection component 830 as described with reference to FIG. 8.

At 1520, the method may include transmitting the quantity of repetitions of the first random access message using a same spatial filter via the set of random access occasions. The operations of 1520 may be performed in accordance with examples as disclosed herein. In some examples, aspects of the operations of 1520 may be performed by a random access repetition transmitter 835 as described with reference to FIG. 8.

Figure 16:
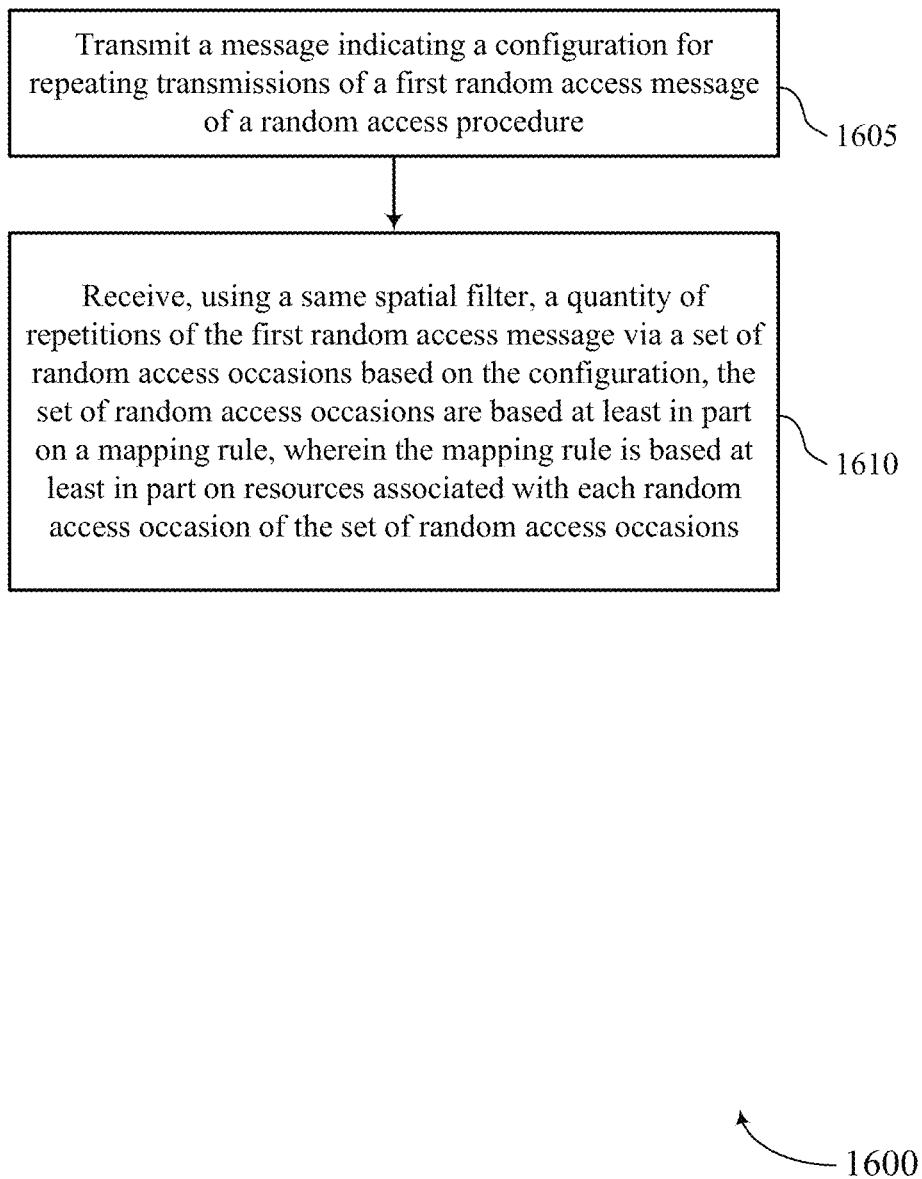

FIG. 16 shows a flowchart illustrating a method 1600 that supports resource mapping for random access repetitions using a same spatial filter in accordance with one or more aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include transmitting a message indicating a configuration for repeating transmissions of a first random access message of a random access procedure. The operations of 1605 may be performed in accordance with examples as disclosed herein. In some examples, aspects of the operations of 1605 may be performed by a configuration transmitter 1225 as described with reference to FIG. 12.

At 1610, the method may include receiving, using a same spatial filter, a quantity of repetitions of the first random access message over a set of random access occasions based on the configuration, the set of random access occasions are based on a mapping rule, where the mapping rule is based on resources associated with each random access occasion of the set of random access occasions. The operations of 1610 may be performed in accordance with examples as disclosed herein. In some examples, aspects of the operations of 1610 may be performed by a random access repetition receiver 1230 as described with reference to FIG. 12.

Figure 17:
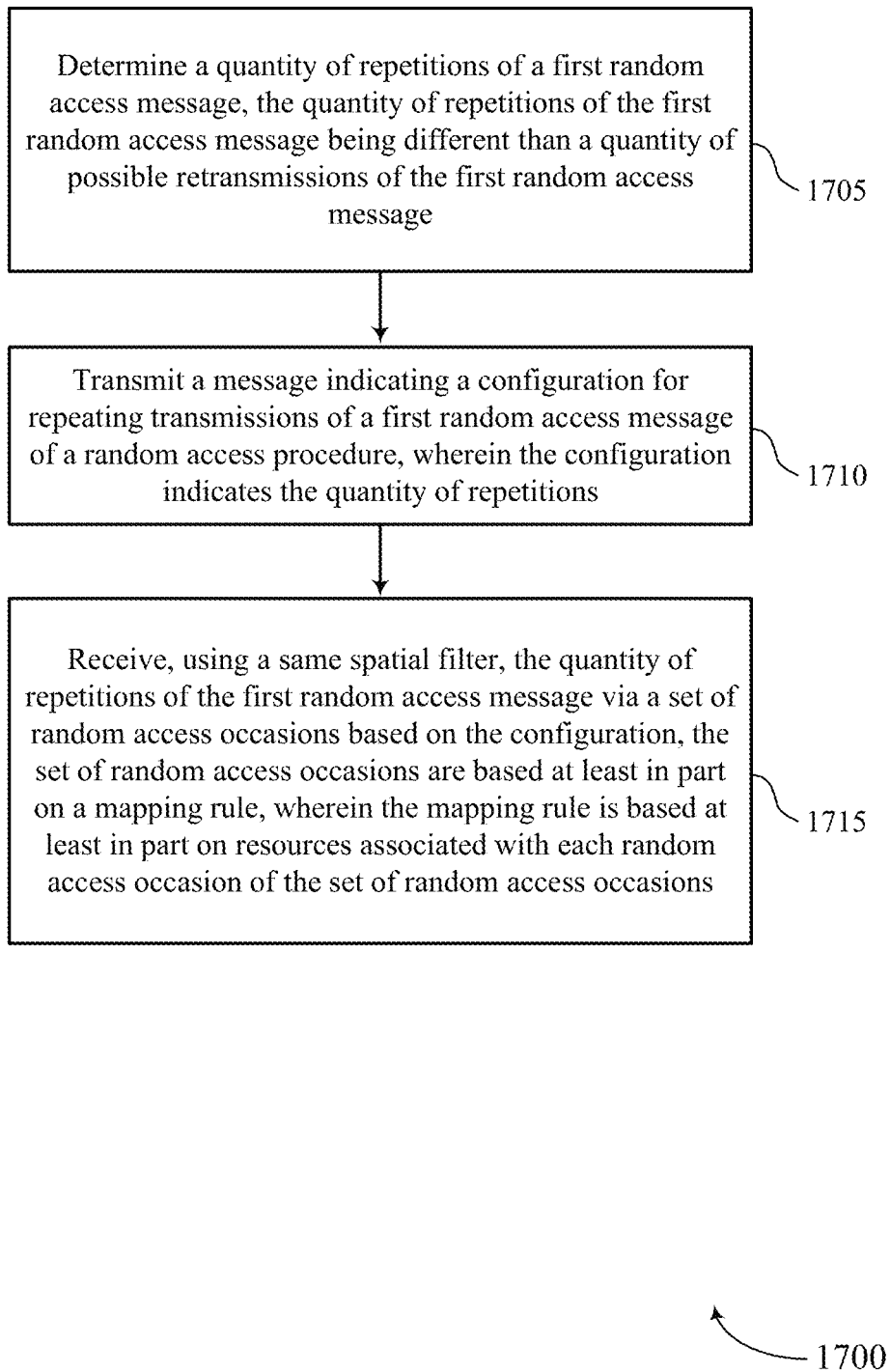

FIG. 17 shows a flowchart illustrating a method 1700 that supports resource mapping for random access repetitions using a same spatial filter in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include determining a quantity of repetitions of a first random access message, the quantity of repetitions of the first random access message being different than a quantity of possible retransmissions of the first random access message. The operations of 1705 may be performed in accordance with examples as disclosed herein. In some examples, aspects of the operations of 1705 may be performed by a repetition number determination component 1235 as described with reference to FIG. 12.

At 1710, the method may include transmitting a message indicating a configuration for repeating transmissions of a first random access message of a random access procedure, where the configuration indicates the quantity of repetitions. The operations of 1710 may be performed in accordance with examples as disclosed herein. In some examples, aspects of the operations of 1710 may be performed by a configuration transmitter 1225 as described with reference to FIG. 12.

At 1715, the method may include receiving, using a same spatial filter, a quantity of repetitions of the first random access message over a set of random access occasions based on the configuration, the set of random access occasions are based on a mapping rule, where the mapping rule is based on resources associated with each random access occasion of the set of random access occasions. The operations of 1715 may be performed in accordance with examples as disclosed herein. In some examples, aspects of the operations of 1715 may be performed by a random access repetition receiver 1230 as described with reference to FIG. 12.

The following provides an overview of aspects of the present disclosure:

Aspect 1: A method for wireless communications at a UE, comprising: receiving a message indicating a configuration for repeating transmissions of a first random access message of a random access procedure; selecting a set of random access occasions for a quantity of repetitions of the first random access message in accordance with the configuration and a mapping rule, wherein the mapping rule is based at least in part on resources associated with each random access occasion of the set of random access occasions; and transmitting the quantity of repetitions of the first random access message using a same spatial filter via the set of random access occasions.

Aspect 2: The method of aspect 1, wherein selecting the set of random access occasions in accordance with the mapping rule comprises: identifying a channel state information-reference signal, a synchronization signal block from a set of synchronization signal blocks, or both; and selecting the set of random access occasions based at least in part on an association between the set of random access occasions, the synchronization signal block, the channel state information reference signal, or a combination thereof.

Aspect 3: The method of aspect 2, wherein selecting the set of random access occasions in accordance with the mapping rule further comprises: selecting one or more first random access occasions based at least in part on a respective frequency-domain index of the resources associated with each random access occasion of the set of random access occasions.

Aspect 4: The method of aspect 3, wherein selecting the set of random access occasions in accordance with the mapping rule further comprises: selecting one or more second random access occasions based at least in part on a respective time-domain index of the resources associated with each random access occasion of the set of random access occasions, the one or more second random access occasions being included in a same slot.

Aspect 5: The method of aspect 4, wherein selecting the set of random access occasions in accordance with the mapping rule further comprises: selecting one or more third random access occasions based at least in part on a respective slot index of the resources associated with each random access occasion of the set of random access occasions.

Aspect 6: The method of aspect 5, wherein selecting the set of random access occasions in accordance with the mapping rule further comprises: selecting one or more fourth random access occasions based at least in part on a respective association period index of the resources associated with each random access occasion of the set of random access occasions.

Aspect 7: The method of any of aspects 1 through 6, wherein selecting the set of random access occasions in accordance with the mapping rule comprises: identifying a channel state information-reference signal, a synchronization signal block from a set of synchronization signal blocks, or both; and selecting the set of random access occasions based at least in part on an association between the set of random access occasions, the synchronization signal block, the channel state information-reference signal, or a combination thereof, wherein respective random access occasions of the set of random access occasions are non-overlapping in time.

Aspect 8: The method of aspect 7, wherein selecting the set of random access occasions in accordance with the mapping rule further comprises: selecting one or more first random access occasions based at least in part on a respective time-domain index of the resources associated with each random access occasion of the set of random access occasions, the one or more first random access occasions being included in a same slot.

Aspect 9: The method of aspect 8, wherein selecting the set of random access occasions in accordance with the mapping rule further comprises: selecting one or more second random access occasions based at least in part on a respective slot index of the resources associated with each random access occasion of the set of random access occasions.

Aspect 10: The method of aspect 9, wherein selecting the set of random access occasions in accordance with the mapping rule further comprises: selecting one or more third random access occasions based at least in part on a respective association period index of the resources associated with each random access occasion of the set of random access occasions.

Aspect 11: The method of any of aspects 1 through 10, further comprising: identifying the quantity of repetitions of the first random access message based at least in part on the configuration, wherein the quantity of repetitions of the first random access message is the same as a quantity of possible retransmissions of the first random access message.

Aspect 12: The method of any of aspects 1 through 11, further comprising: identifying the quantity of repetitions of the first random access message based at least in part on the configuration, wherein the quantity of repetitions of the first random access message is different than a quantity of possible retransmissions of the first random access message.

Aspect 13: The method of any of aspects 1 through 12, wherein the mapping rule comprises a first mapping rule for respective random access occasions of the set of random access occasions that overlap in time or a second mapping rule for the respective random access occasions of the set of random access occasions that are non-overlapping in time, the method further comprising: receiving a second message configuring the UE with the first mapping rule or the second mapping rule.

Aspect 14: The method of aspect 13, wherein the message comprises a radio resource control message or a system information message, or any combination thereof.

Aspect 15: The method of any of aspects 1 through 14, wherein transmitting the quantity of repetitions of the first random access message comprises: transmitting the quantity of repetitions of the first random access message across two or more association patterns based at least in part on a quantity of random access occasions in the set of random access occasions.

Aspect 16: The method of any of aspects 1 through 14, wherein transmitting the quantity of repetitions of the first random access message comprises: transmitting an initial portion of the quantity of repetitions of the first random access message during a current association pattern based at least in part on a quantity of random access occasions in the set of random access occasions; and stopping transmission of a remaining portion of the quantity of repetitions of the first random access message after the current association pattern ends.

Aspect 17: The method of any of aspects 1 through 14, wherein the quantity of repetitions of the first random access message are transmitted within a single association pattern.

Aspect 18: The method of any of aspects 1 through 17, wherein the random access procedure comprises a four-step random access procedure or a two-step random access procedure.

Aspect 19: A method for wireless communications at a network entity, comprising: transmitting a message indicating a configuration for repeating transmissions of a first random access message of a random access procedure; and receiving, using a same spatial filter, a quantity of repetitions of the first random access message over a set of random access occasions based at least in part on the configuration, the set of random access occasions are based at least in part on a mapping rule, wherein the mapping rule is based at least in part on resources associated with each random access occasion of the set of random access occasions.

Aspect 20: The method of aspect 19, wherein the set of random access occasions are based at least in part on an association between the set of random access occasions and a same synchronization signal block or a same channel state information reference signal.

Aspect 21: The method of aspect 20, wherein the set of random access occasions are based at least in part on a respective frequency-domain index of the resources associated with each random access occasion, or a respective time-domain index of the resources associated with each random access occasion of the set of random access occasions, or a respective slot index of the resources associated with each random access occasion of the set of random access occasions, or a respective association period index of the resources associated with each random access occasion of the set of random access occasions, or any combination thereof.

Aspect 22: The method of any of aspects 19 through 21, further comprising: determining the quantity of repetitions of the first random access message, the quantity of repetitions of the first random access message being the same as a quantity of possible retransmissions of the first random access message, wherein the configuration indicates the quantity of repetitions.

Aspect 23: The method of any of aspects 19 through 22, further comprising: determining the quantity of repetitions of the first random access message, the quantity of repetitions of the first random access message being different than a quantity of possible retransmissions of the first random access message, wherein the configuration indicates the quantity of repetitions.

Aspect 24: The method of any of aspects 19 through 23, wherein the mapping rule comprises a first mapping rule for respective random access occasions of the set of random access occasions that overlap in time or a second mapping rule for the respective random access occasions of the set of random access occasions that are non-overlapping in time, the method further comprising: transmitting a second message configuring a UE with the first mapping rule or the second mapping rule.

Aspect 25: The method of aspect 24, wherein the message comprises a radio resource control message or a system information message, or any combination thereof.

Aspect 26: The method of any of aspects 19 through 25, wherein receiving the quantity of repetitions of the first random access message comprises: receiving the quantity of repetitions of the first random access message across two or more association patterns based at least in part on a quantity of random access occasions in the set of random access occasions.

Aspect 27: The method of any of aspects 19 through 25, wherein receiving the quantity of repetitions of the first random access message comprises: receiving an initial portion of the quantity of repetitions of the first random access message during a current association pattern based at least in part on a quantity of random access occasions in the set of random access occasions, wherein a remaining portion of the quantity of repetitions of the first random access message are not received after the current association pattern ends.

Aspect 28: The method of any of aspects 19 through 25, wherein the quantity of repetitions of the first random access message are received within a single association pattern.

Aspect 29: An apparatus for wireless communications at a UE, comprising one or more memories; and one or more processors coupled with the one or more memories and configured to cause the apparatus to perform a method of any of aspects 1 through 18.

Aspect 30: An apparatus for wireless communications at a UE, comprising at least one means for performing a method of any of aspects 1 through 18.

Aspect 31: A non-transitory computer-readable medium storing code for wireless communications at a UE, the code comprising instructions executable by one or more processors to perform a method of any of aspects 1 through 18.

Aspect 32: An apparatus for wireless communications at a network entity, comprising one or more memories; and one or more processors coupled with the one or more processors and configured to cause the apparatus to perform a method of any of aspects 19 through 28.

Aspect 33: An apparatus for wireless communications at a network entity, comprising at least one means for performing a method of any of aspects 19 through 28.

Aspect 34: A non-transitory computer-readable medium storing code for wireless communications at a network entity, the code comprising instructions executable by one or more processors to perform a method of any of aspects 19 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
    one or more memories; and
    one or more processors coupled with the one or more memories and configured to cause the apparatus to:
        receive a message indicating a configuration for repeating transmissions of a first random access message of a random access procedure;
        select a set of random access occasions for a quantity of repetitions of the first random access message in accordance with the configuration and a mapping rule, wherein:
            the set of random access occasions is based at least in part on an association between the set of random access occasions and one or more synchronization signal blocks,
            the mapping rule is based at least in part on resources associated with each random access occasion of the set of random access occasions,
            a first valid random access occasion of the set of random access occasions is determined in accordance with the mapping rule comprising an ordering of valid random access occasions within a time period, the ordering comprising first, in increasing order of frequency resource index for frequency multiplexed random access occasions, and second, in increasing order of a time resource index for time multiplexed random access occasions, and respective random access occasions of the set of random access occasions are non-overlapping in time; and
        transmit the quantity of repetitions of the first random access message using a same spatial filter via the set of random access occasions.

2. The apparatus of claim 1, wherein, to select the set of random access occasions in accordance with the mapping rule, the one or more processors are further configured to cause the apparatus to:
    identify a channel state information reference signal, a synchronization signal block from a set of synchronization signal blocks, or both; and
    select the set of random access occasions based at least in part on an association between the set of random access occasions, the synchronization signal block, the channel state information reference signal, or a combination thereof.

3. The apparatus of claim 2, wherein, to select the set of random access occasions in accordance with the mapping rule, the one or more processors are further configured to cause the apparatus to:
    select one or more first random access occasions based at least in part on a respective frequency-domain index of the resources associated with each random access occasion of the set of random access occasions.

4. The apparatus of claim 3, wherein, to select the set of random access occasions in accordance with the mapping rule, the one or more processors are further configured to cause the apparatus to:
    select one or more second random access occasions based at least in part on a respective time-domain index of the resources associated with each random access occasion of the set of random access occasions, the one or more second random access occasions being included in a same slot.

5. The apparatus of claim 4, wherein, to select the set of random access occasions in accordance with the mapping rule, the one or more processors are further configured to cause the apparatus to:
    select one or more third random access occasions based at least in part on a respective slot index of the resources associated with each random access occasion of the set of random access occasions.

6. The apparatus of claim 5, wherein, to select the set of random access occasions in accordance with the mapping rule, the one or more processors are further configured to cause the apparatus to:
    select one or more fourth random access occasions based at least in part on a respective association period index of the resources associated with each random access occasion of the set of random access occasions.

7. The apparatus of claim 1, wherein, to select the set of random access occasions in accordance with the mapping rule, the one or more processors are further configured to cause the apparatus to:
    select one or more first random access occasions based at least in part on a respective time-domain index of the resources associated with each random access occasion of the set of random access occasions, the one or more first random access occasions being included in a same slot.

8. The apparatus of claim 7, wherein, to select the set of random access occasions in accordance with the mapping rule, the one or more processors are further configured to cause the apparatus to:
    select one or more second random access occasions based at least in part on a respective slot index of the resources associated with each random access occasion of the set of random access occasions.

9. The apparatus of claim 8, wherein, to select the set of random access occasions in accordance with the mapping rule, the one or more processors are further configured to cause the apparatus to:
select one or more third random access occasions based at least in part on a respective association period index of the resources associated with each random access occasion of the set of random access occasions.

10. The apparatus of claim 1, wherein the one or more processors are further configured to cause the apparatus to:
identify the quantity of repetitions of the first random access message based at least in part on the configuration, wherein the quantity of repetitions of the first random access message is the same as a quantity of possible retransmissions of the first random access message.

11. The apparatus of claim 1, wherein the one or more processors are further configured to cause the apparatus to:
identify the quantity of repetitions of the first random access message based at least in part on the configuration, wherein the quantity of repetitions of the first random access message is different than a quantity of possible retransmissions of the first random access message.

12. The apparatus of claim 1, wherein the mapping rule comprises a first mapping rule for respective random access occasions of the set of random access occasions that overlap in time or a second mapping rule for the respective random access occasions of the set of random access occasions that are non-overlapping in time, and the one or more processors are further configured to cause the apparatus to:
receive a second message configuring the UE with the first mapping rule or the second mapping rule.

13. The apparatus of claim 12, wherein the message comprises a radio resource control message or a system information message, or any combination thereof.

14. The apparatus of claim 1, wherein, to transmit the quantity of repetitions of the first random access message, the one or more processors are further configured to cause the apparatus to:
transmit the quantity of repetitions of the first random access message across two or more association patterns based at least in part on a quantity of random access occasions in the set of random access occasions.

15. The apparatus of claim 1, wherein, to transmit the quantity of repetitions of the first random access message, the one or more processors are further configured to cause the apparatus to:
transmit an initial portion of the quantity of repetitions of the first random access message during a current association pattern based at least in part on a quantity of random access occasions in the set of random access occasions; and
stop transmission of a remaining portion of the quantity of repetitions of the first random access message after the current association pattern ends.

16. The apparatus of claim 1, wherein the quantity of repetitions of the first random access message are transmitted within a single association pattern.

17. The apparatus of claim 1, wherein the random access procedure comprises a four-step random access procedure or a two-step random access procedure.

18. An apparatus for wireless communications at a network entity, comprising:
one or more memories; and
one or more processors coupled with the one or more memories and configured to cause the apparatus to:
transmit a message indicating a configuration for repeating transmissions of a first random access message of a random access procedure; and
receive, using a same spatial filter, a quantity of repetitions of the first random access message over a set of random access occasions based at least in part on the configuration, the set of random access occasions are based at least in part on a mapping rule, wherein:
the set of random access occasions is based at least in part on an association between the set of random access occasions and one or more synchronization signal blocks,
the mapping rule is based at least in part on resources associated with each random access occasion of the set of random access occasions,
a repetition of the quantity of repetitions is received via a first valid random access occasion of the set of random access occasions in accordance with the mapping rule comprising an ordering of valid random access occasions within a time period, the ordering comprising: first, in increasing order of frequency resource index for frequency multiplexed random access occasions, and second, in increasing order of a time resource index for time multiplexed random access occasions, and
respective random access occasions of the set of random access occasions are non-overlapping in time.

19. The apparatus of claim 18, wherein the set of random access occasions are based at least in part on an association between the set of random access occasions and a same synchronization signal block or a same channel state information reference signal.

20. The apparatus of claim 19, wherein the set of random access occasions are based at least in part on a respective frequency-domain index of the resources associated with each random access occasion, or a respective time-domain index of the resources associated with each random access occasion of the set of random access occasions, or a respective slot index of the resources associated with each random access occasion of the set of random access occasions, or a respective association period index of the resources associated with each random access occasion of the set of random access occasions, or any combination thereof.

21. The apparatus of claim 18, wherein the one or more processors are further configured to cause the apparatus to:
determine the quantity of repetitions of the first random access message, the quantity of repetitions of the first random access message being the same as a quantity of possible retransmissions of the first random access message, wherein the configuration indicates the quantity of repetitions.

22. The apparatus of claim 18, wherein the one or more processors are further configured to cause the apparatus to:
determine the quantity of repetitions of the first random access message, the quantity of repetitions of the first random access message being different than a quantity of possible retransmissions of the first random access message, wherein the configuration indicates the quantity of repetitions.

23. The apparatus of claim 18, wherein the mapping rule comprises a first mapping rule for respective random access occasions of the set of random access occasions that overlap in time or a second mapping rule for the respective random access occasions of the set of random access occasions that are non-overlapping in time, and the one or more processors are further configured to cause the apparatus to:

transmit a second message configuring a user equipment (UE) with the first mapping rule or the second mapping rule.

24. The apparatus of claim 23, wherein the message comprises a radio resource control message or a system information message, or any combination thereof.

25. The apparatus of claim 18, wherein, to receive the quantity of repetitions of the first random access message, the one or more processors are further configured to cause the apparatus to:
receive the quantity of repetitions of the first random access message across two or more association patterns based at least in part on a quantity of random access occasions in the set of random access occasions.

26. The apparatus of claim 18, wherein, to receive the quantity of repetitions of the first random access message, the one or more processors are further configured to cause the apparatus to:
receive an initial portion of the quantity of repetitions of the first random access message during a current association pattern based at least in part on a quantity of random access occasions in the set of random access occasions, wherein a remaining portion of the quantity of repetitions of the first random access message are not received after the current association pattern ends.

27. The apparatus of claim 18, wherein the quantity of repetitions of the first random access message are received within a single association pattern.

28. A method for wireless communications at a user equipment (UE), comprising:
receiving a message indicating a configuration for repeating transmissions of a first random access message of a random access procedure;
selecting a set of random access occasions for a quantity of repetitions of the first random access message in accordance with the configuration and a mapping rule, wherein;
the set of random access occasions is based at least in part on an associated between the set of random access occasions and one or more synchronization signal blocks,
the mapping rule is based at least in part on resources associated with each random access occasion of the set of random access occasions,
a first valid random access occasion of the set of random access occasions is determined in accordance with the mapping rule comprising an ordering of valid random access occasions within a time period, the ordering comprising: first, in increasing order of frequency resource index for frequency multiplexed random access occasions, and second, in increasing order of a time resource index for time multiplexed random access occasions, and
respective random access occasions of the set of random access occasions are non-overlapping in time; and
transmitting the quantity of repetitions of the first random access message using a same spatial filter via the set of random access occasions.

29. A method for wireless communications at a network entity, comprising:
transmitting a message indicating a configuration for repeating transmissions of a first random access message of a random access procedure; and
receiving, using a same spatial filter, a quantity of repetitions of the first random access message over a set of random access occasions based at least in part on the configuration, the set of random access occasions are based at least in part on a mapping rule, wherein:
the set of random access occasions is based at least in part on an association between the set of random access occasions and one or more synchronization signal blocks,
the mapping rule is based at least in part on resources associated with each random access occasion of the set of random access occasions,
a repetition of the quantity of repetitions is received via a first valid random access occasion of the set of random access occasions in accordance with the mapping rule comprising an ordering of valid random access occasions within a time period, the ordering comprising: first, in increasing order of frequency resource index for frequency multiplexed random access occasions, and second, in increasing order of a time resource index for time multiplexed random access occasions, and
respective random access occasions of the set of random access occasions are non-overlapping in time.

* * * * *